(12) United States Patent
Ito

(10) Patent No.: US 8,341,583 B2
(45) Date of Patent: Dec. 25, 2012

(54) PACKAGING DESIGN SUPPORTING DEVICE AND PACKAGING DESIGN SUPPORTING METHOD FOR SEMICONDUCTOR INTEGRATED CIRCUIT AND RECORDING MEDIUM

(75) Inventor: Noriyuki Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 276 days.

(21) Appl. No.: 12/662,136

(22) Filed: Mar. 31, 2010

(65) Prior Publication Data

US 2010/0199248 A1 Aug. 5, 2010

Related U.S. Application Data

(63) Continuation of application No. PCT/JP2007/069703, filed on Oct. 9, 2007.

(51) Int. Cl.
*G06F 17/50* (2006.01)

(52) U.S. Cl. .......................... 716/122; 716/119

(58) Field of Classification Search ............... 716/118, 716/119, 122, 126, 129, 130, 132
See application file for complete search history.

(56) References Cited

U.S. PATENT DOCUMENTS

| 6,467,070 B2 | 10/2002 | Kuroda et al. | |
|---|---|---|---|
| 2005/0138591 A1 | 6/2005 | Shirai et al. | |
| 2008/0050676 A1* | 2/2008 | Hoshino | 430/296 |

FOREIGN PATENT DOCUMENTS

| JP | 6-295956 | 10/1994 |
|---|---|---|
| JP | 2001-351979 | 12/2001 |
| JP | 2002-16143 | 1/2002 |
| JP | 2002-151594 | 5/2002 |
| JP | 2002-157292 | 5/2002 |
| JP | 2005-202928 | 7/2005 |
| JP | 2006-40111 | 2/2006 |

OTHER PUBLICATIONS

Japanese Office Action mailed Dec. 13, 2011 issued in corresponding Japanese Patent Application No. 2009-536880.
International Search Report for PCT/JP2007/069703, mailed on Dec. 25, 2007.

* cited by examiner

*Primary Examiner* — Vuthe Siek

(74) *Attorney, Agent, or Firm* — Staas & Halsey LLP

(57) ABSTRACT

A disclosed packaging design supporting device for a semiconductor integrated circuit includes a selection data acquisition unit inputting a change of the selected logic cell; a bulk fix data generation unit generating bulk fix data in which a bulk layer of the semiconductor substrate of the semiconductor integrated circuit has been fixed, arranging a design-change dummy logic cell in a region where no logic cell is arranged in the bulk layer, and generating a design-change logic cell by wiring the design-change dummy logic cell; and a selection cell move determination unit prohibiting the change with respect to the selected logic cell.

12 Claims, 16 Drawing Sheets

FIG.2

|  | NET LIST | LAYOUT |
|---|---|---|
| (1) NET LIST DESIGN | Inst A<br>Inst B<br>Inst C<br>Net 1<br>Net 2 |  |
| (2) LAYOUT DESIGN |  | Inst A placed(loc p1)<br>Inst B placed(loc p2)<br>Inst C placed(loc p3)<br>Net 1 routed(set r1)<br>Net 2 routed(set r2) |
| (3) NET LIST CHANGE | Inst A<br>Inst B<br>Inst C<br>Inst D<br>Inst E<br>Net 1<br>Net 2<br>Net 3<br>Net 4 |  |
| (4) LAYOUT CHANGE |  | Inst A placed(loc p1)<br>Inst B placed(loc p2)<br>Inst C placed(loc p3)<br>Inst D placed(loc p4)<br>Inst E placed(loc p5)<br>Net 1 routed(set r1)<br>Net 2 routed(set r2)<br>Net 3 routed(set r3)<br>Net 4 routed(set r4) |
| (5) NET LIST CHANGE | Inst A<br>Inst B<br>Inst D<br>Inst E<br>Net 1<br>Net 3<br>Net 4 |  |
| (6) LAYOUT CHANGE |  | Inst A placed(loc p1)<br>Inst B placed(loc p2)<br>Inst D placed(loc p4)<br>Inst E placed(loc p5)<br>Net 1 routed(set r1)<br>Net 3 routed(set r3)<br>Net 4 routed(set r4) |

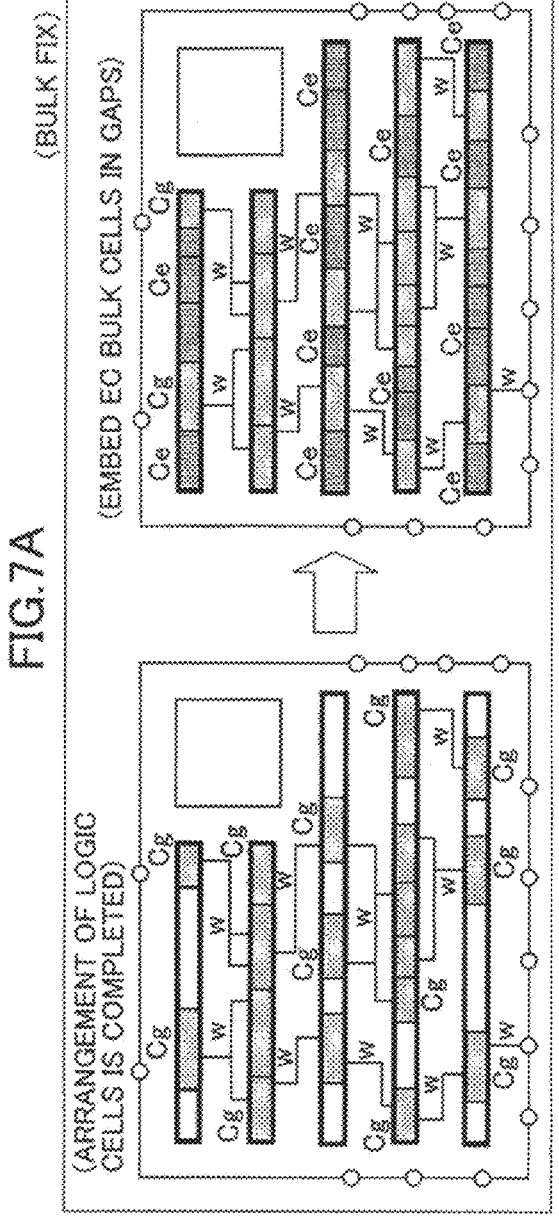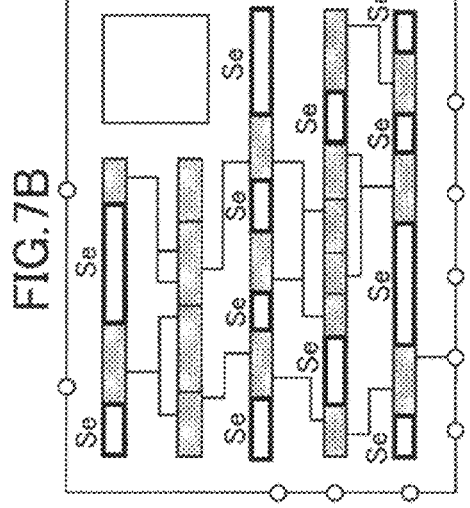

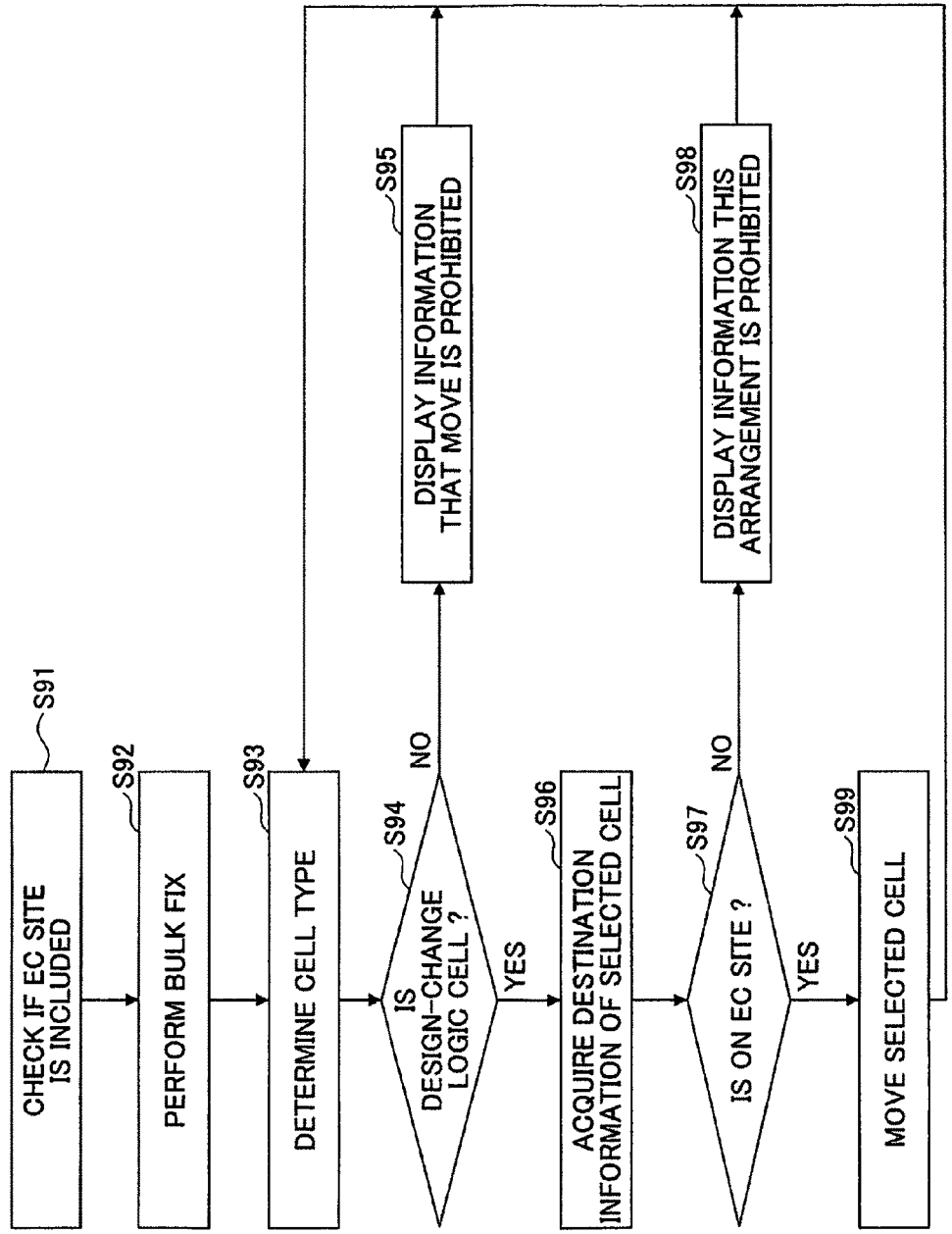

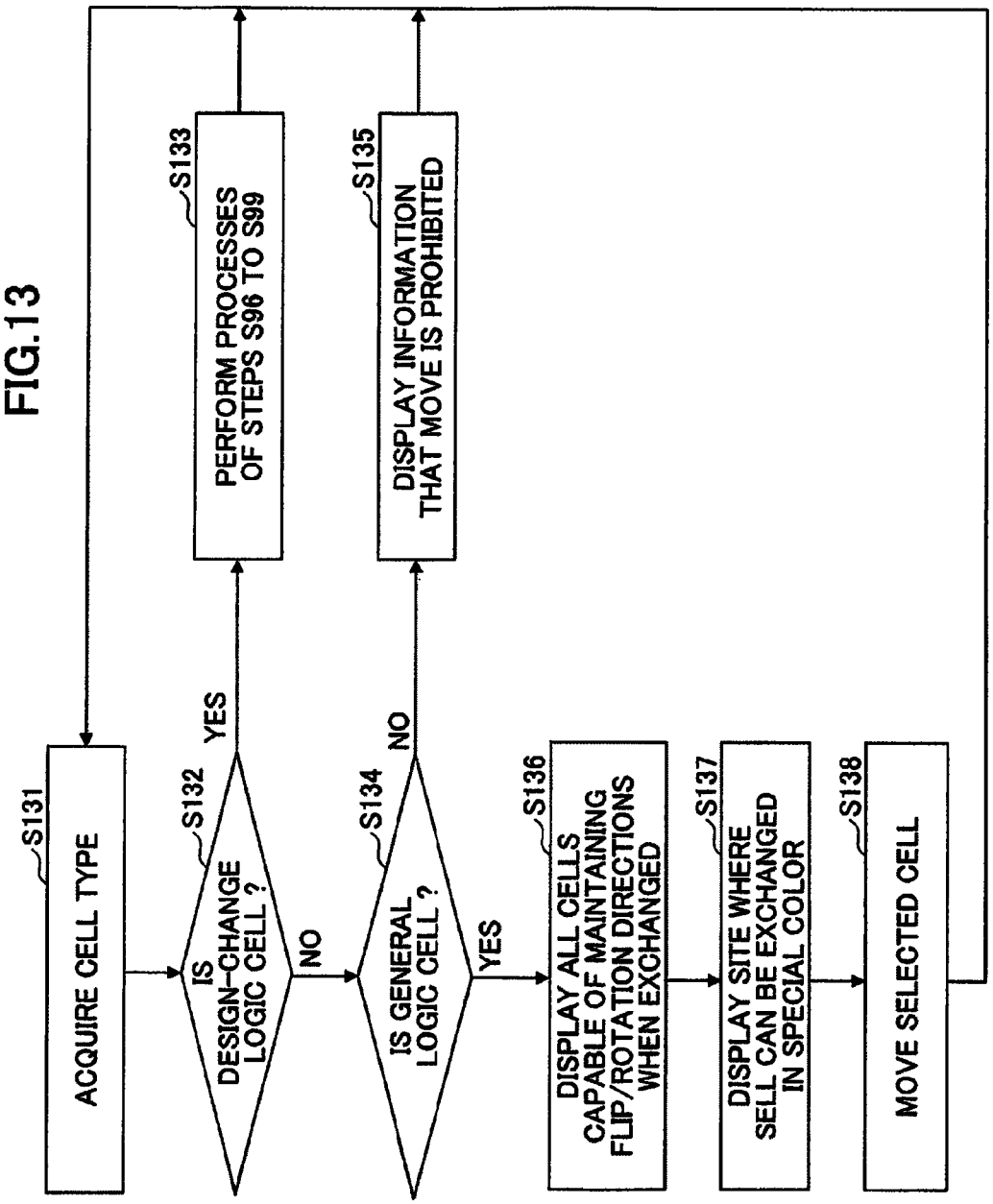

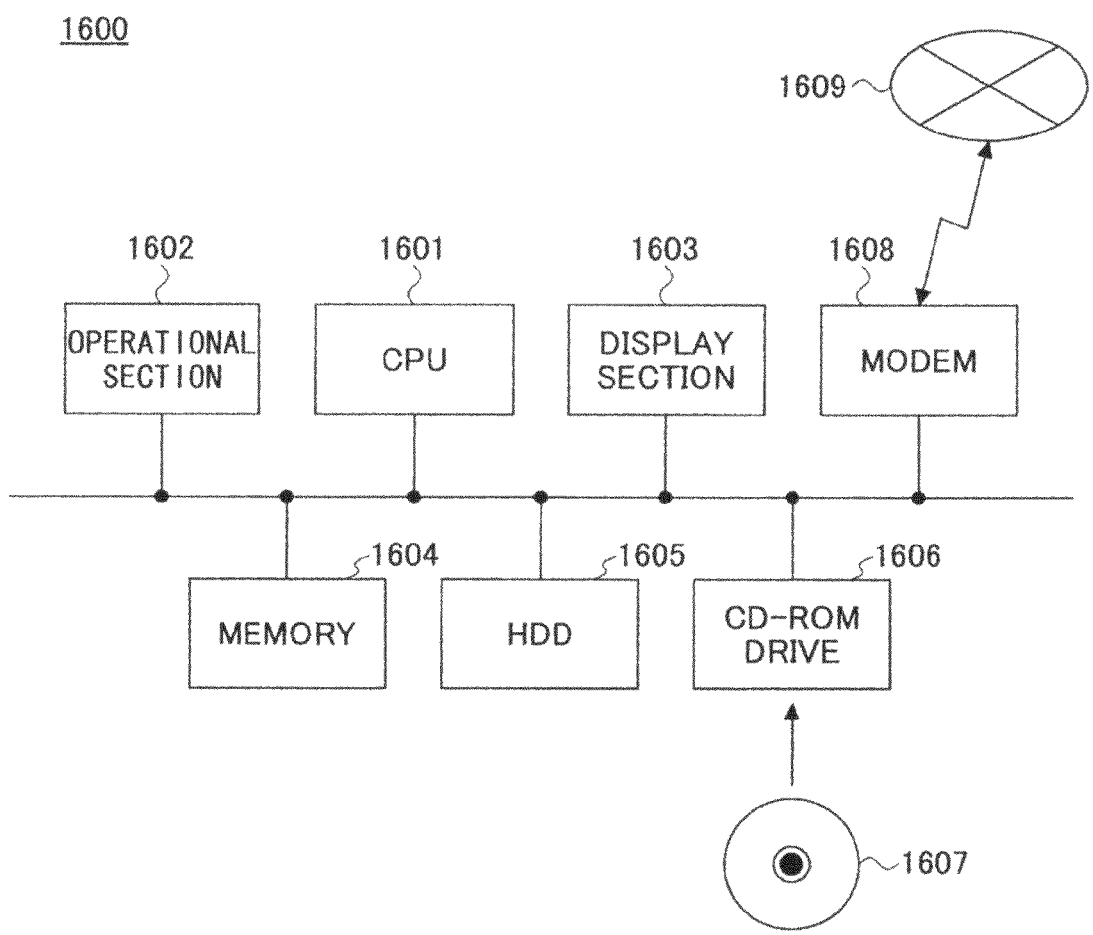

PACKAGING DESIGN SUPPORTING DEVICE AND PACKAGING DESIGN SUPPORTING METHOD FOR SEMICONDUCTOR INTEGRATED CIRCUIT AND RECORDING MEDIUM

CROSS-REFERENCE TO RELATED APPLICATIONS

This application is a U.S. continuation application filed under 35 USC 111(a) claiming benefit under 35 USC 120 and 365(c) of PCT application JP2007/069703, filed Oct. 9, 2007. The foregoing application is hereby incorporated herein by reference.

FIELD

The embodiment discussed herein is directed to a packaging design supporting device and a packaging design supporting method for a semiconductor integrated circuit and a recording medium storing a packaging design supporting program.

BACKGROUND

A method of automatically arranging a layout of standard cells to prevent latch failures by controlling the internal clock path delay is known. To that end, before starting the automatic layout, some rows of sites for latch cells containing clocks are formed so that no latch cells are arranged in any sites other than those sites. By doing this, the clocks may be wired in the row directions to avoid causing variation in the clock delays by arranging the formed sites in every one or two rows.

On the other hand, it is known that a design support apparatus for semiconductor devices to be used to quickly arrange non-logic cells for reducing electromagnetic radiation from a semiconductor device at the time of designing semiconductor devices. In this design support apparatus for semiconductor devices, a layout section places logic cells and wiring patterns to connect the logic cells. An arranged site detecting section detects an arranged site, which site contains neither the logic cells nor a prohibited area, after a layout is done by the layout section. A non-logic cell pattern store section stores non-logic cell patterns. A prohibited area containing site detecting section detects a prohibited area containing a site, which site contains only a prohibited area. A non-logic cell arranging section arranges non-logic cells on the arranged site. Furthermore, the non-logic cell arranging section compares the arrangement of the prohibited area on the prohibited area containing site with a non-logic cell pattern and arranges non-logic cells only on a site where these do not conflict with each other.

[Patent Document 1] Japanese Laid-Open Patent Publication No. 6-295956

[Patent Document 2] Japanese Laid-Open Patent Publication No. 2001-351979

SUMMARY

According to an aspect of the present invention, there is provided a packaging design supporting device for arranging logic cells constituting a semiconductor integrated circuit and designing wirings between the logic cells. The packaging design supporting device includes a selection data acquisition unit selecting a logic cell and inputting a change with respect to the selected logic cell; a bulk fix data generation unit generating bulk fix data in which, with respect to a semiconductor substrate of the semiconductor integrated circuit, a bulk layer of the semiconductor substrate of the semiconductor integrated circuit has been fixed, arranging, after the bulk fix data are generated, a design-change dummy logic cell in a region where no logic cell is arranged in the bulk layer, the design-change dummy logic cell having no wiring yet, and generating a design-change logic cell by wiring the design-change dummy logic cell in a region where the design-change dummy logic cell is arranged even after the bulk fix data are generated; and a selection cell move determination unit, when the bulk fix data generation unit generates the bulk fix data and the change with respect to the selected logic cell is input to the selection data acquisition unit, prohibiting the change with respect to the selected logic cell The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is another drawing illustrating the incremental design method in packaging design of a semiconductor integrated circuit;

FIGS. 7A and 7B are first drawings illustrating an exemplary process of a packaging design supporting method for a semiconductor integrated circuit according to an embodiment of the present invention;

FIG. 9 is a third flowchart illustrating an exemplary process of a packaging design supporting method for a semiconductor integrated circuit according to an embodiment of the present invention;

FIG. 13 is a fifth flowchart illustrating an exemplary process of a packaging design supporting method for a semiconductor integrated circuit according to an embodiment of the present invention;

FIG. 16 is a hardware block diagram illustrating an exemplary configuration capable of carrying out the packaging design supporting method for a semiconductor integrated circuit according to an embodiment of the present invention.

DESCRIPTION OF EMBODIMENT

In the description, the term "cell" refers to a "logic cell" having a transistor(s) and constituting a logic circuit such as an AND cell (logic AND circuit), an OR cell (logic OR circuit), and an INV cell (logic INVERTER circuit).

When a packaging design or an implementation design is performed on a semiconductor integrated circuit with an aid of computer simulation such as in CAD (Computer Aided Design), a so-called incremental design method may be employed in which a new design change process is performed while maintaining a region on which the design change process has been once performed.

Further, for example, when this incremental design method is employed in a packaging design process of a processor as a semiconductor integrated circuit from its initial design stage, it may become possible to continually adjust the operation timings (e.g., timing delay) of the processor so as to obtain its final target performance or operation frequency.

Figure 1:
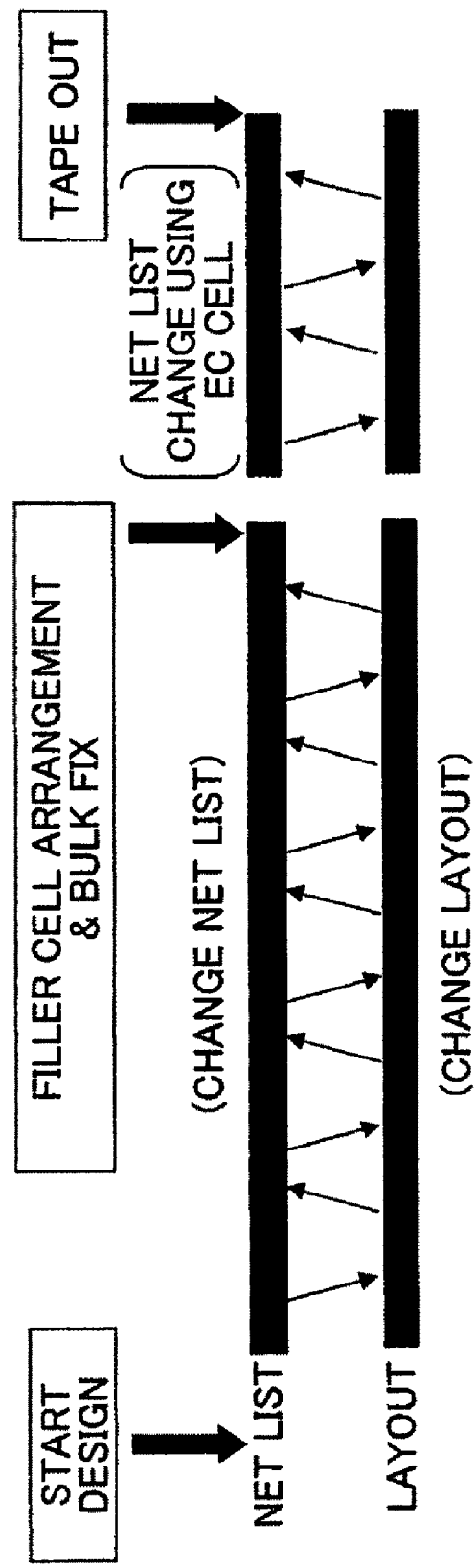
FIG. 1 is a drawing illustrating an incremental design method in packaging design of a semiconductor integrated circuit.

FIGS. 1 and 2 schematically illustrate an exemplary packaging design process employing the incremental design method.

As illustrated in FIG. 1, in the incremental design method, first, a net list is generated, and a layout process of logic cells is performed based on the net list.

More specifically, in (1) net list design of FIG. 2, instances A, B, and C (i.e., entities of the logic cells) are provided, and then, nets 1 and 2 (i.e., wirings between the logic cells) are provided.

Next, in (2) layout design of FIG. 2, similar to the (1) net list design, the instances A, B, and C are arranged, and the nets 1 and 2 between the instances are wired.

Further, based on the (2) layout design, (3) net list change of FIG. 2 is performed.

Next, in (4) layout change of FIG. 2, the layout is changed in accordance with the design change in the (3) net list change.

Then, based on the changed layout, (5) net list change of FIG. 2 is performed.

Next, in (6) layout change of FIG. 2, the layout is further changed in accordance with the design change in the (5) net list change.

By alternately repeating the net list change and the layout change in this way, a circuit configuration capable of achieving originally desired performance may be obtained. Further, during this process, for example, an operation timing of the logic circuit may be adjusted to meet the final performance target or operation frequency.

When the layout design process is completed by doing in this way, a so-called tape out is performed on the completed layout data.

Herein, the term "tape out" refers to a process in which a layout data of completed semiconductor integrated circuit are recorded in a recording medium such as a magnetic tape, and the recording medium is transferred to a manufacturing division of the semiconductor integrated circuits.

Further, to reduce the manufacturing process (schedule) of the semiconductor integrated circuit, a so-called bulk fix may be performed when the layout process is advanced to some extent.

Herein, the term "bulk fix" refers to a process in which the logic cells are fixed in a bulk layer, the logic cells having transistors and constituting a logic circuit of the semiconductor integrated circuit.

Namely, in the bulk fix, the logic cells are fixed in the bulk layer of the semiconductor substrate. Then, in the following design process, the wirings are arranged (formed) between the logic cells that have been fixed in the bulk layer, so that design requirements such as the operating frequency can be satisfied.

Further, once the bulk fix is performed (after the bulk fix), in the design change process, a change (exchange) of the logic cell having transistors is prohibited in the bulk layer. Due to this prohibition, the manufacturing division of the semiconductor integrated circuit may start manufacturing the part of the logic cells (i.e., the bulk layer part) in advance (i.e., before manufacturing other parts).

Further, in a layout design process, once the bulk fix is performed, the design change of the net lists is appropriately performed by changing the wirings within a defined area without changing the logic cells of a logic circuit.

As described above, the manufacturing division of the semiconductor integrated circuit may start manufacturing the bulk layer of a semiconductor integrated circuit in advance, once the bulk fix is performed. Because of this feature, it may become possible to effectively reduce the working hours in the manufacturing process of the semiconductor integrated circuit after the "tape out", thereby enabling reducing overall manufacturing time (schedule) of the semiconductor integrated circuit.

However, in a case where, after the bulk fix is performed, the arrangement of a transistor device in the semiconductor integrated circuit has been changed, the manufacturing division of the semiconductor integrated circuit may have to go back to restart manufacturing the bulk layer, (i.e., manufacturing the changed (revised) bulk layer from the start again) which may cause a problem of the time schedule of manufacturing the semiconductor integrated circuit.

The present invention is made in light of the above problem, and may provide a packaging design supporting device, a packaging design supporting method, and a packaging design supporting program capable of, in a packaging design of a semiconductor integrated circuit, ensuring prohibiting the change of the logic cells in the bulk layer after the bulk fix is performed, the logic cell being a component of a logic circuit and having a transistor device, and capable of adjusting (improving) the operation timing and the like of the logic circuit after the bulk fix is performed, by performing a design change using a design change logic cell which is other than the fixed logic cells without changing the logic cell of the logic circuit in the bulk layer after the bulk fix is performed.

In the following, an embodiment of the present invention is described.

In a packaging design process of a semiconductor integrated circuit, in order to make it possible to update the net list indicating logic data and layout data indicating physical data at the same time, it is desirable not to change the name of the instance which is the entity of the logic cell and the name of the net list indicating connecting relationship between the terminals of the logic cells as much as possible.

Herein, the term "net list" refers to data (logic connection information) indicating a logical connection relationship (i.e., net) between logic cells (i.e., instances) of the logic circuit. The term "layout data" refers to data (arrangement wiring information) indicating actual arranged positions of the cells and a physical positional relationship of the wirings connecting between the cells. The semiconductor integrated circuit is manufactured based on the layout data.

As illustrated in FIG. 1, from the starting time point of the design process, the net list and the layout data are improved (updated) in a parallel manner.

In this case, a back annotation of the logic (i.e., verification of the logic) is performed on the layout data by checking the accordance by using the net list and net name after update as the respective keys.

Further, newly added net and instance in the net list are reflected in the layout data by additionally laying out the added net and instance.

Further, for example, one month before the tape out when the layout data are transferred to the manufacturing division to manufacture a processor as the semiconductor integrated circuit, transistor cells for EC (Engineering Change) bulk cells (described below) are disposed in gaps between already laid out cells by embedding the transistor cells into the respective gaps. Then, the logic cell and the transistor cell for the EC bulk cell disposed in this way are fixed (i.e., the bulk fix is performed).

After the bulk fix is performed, only a design-change logic cell described below can be added, removed, and moved (herein may be collectively referred to as changed); therefore, by using (changing) the design-change logic cell, for example, the operation timing may be adjusted (improved) and a wrong logic design may be corrected; therefore, a design improvement (correction) process may be performed.

Herein, the term "EC cell" refers to a conceptual cell including only a metal wiring to be provided (formed) on a cell as an EC bulk cell which is embedded in the bulk layer when the bulk fix is performed. In this case, the cell as the EC bulk cell refers to the EC bulk cell corresponding to a design-change dummy logic cell.

As described above, by providing (forming), the EC cell on the EC bulk cell (actually EC site described below), it may become possible to form a logic cell such as the AND cell and the OR cell, thereby enabling changing the logic of the logic circuit simply by changing the design of the wirings (a wiring layer). Herein, a logic cell that can be generated by providing (forming) the EC cell on the EC bulk cell (actually the EC site) as described above is called a "design-change logic cell".

Further, the EC bulk cell may also be called an EC filler cell and an EC dummy cell.

A packaging design supporting device, a packaging design supporting method, and a packaging design supporting program for a semiconductor integrated circuit according to an embodiment of the present invention include a configuration (function) capable of performing a lock control function to prohibit the change of the bulk layer (i.e., the change of the arrangement (position) of a transistor device of a logic circuit) in the bulk layer after the bulk fix is performed, and further include a function capable of allowing the change of a cell under a predetermined condition while ensuring that a cell other than the design-change logic cell cannot be changed in the bulk layer.

Herein, the term the "packaging design supporting program for a semiconductor integrated circuit" refers to a software program as a tool providing a function, including CAD functions and the like, of supporting a packaging design or an implementation design operation of a semiconductor integrated circuit performed by a designer when the software program is installed in a computer.

In the packaging design of a semiconductor integrated circuit, as described above, the logic change and the layout change due to the change of the net list are performed in a parallel manner. Because of this feature, only the layout data corresponding to the entire part where logics have been changed in the net list are updated (overwritten); however, on the other hand, the layout data corresponding to the part where no logic has been changed are maintained. This method may be called an EC (Engineering Change) flow, and is used as a fundamental process in the incremental design method.

Regarding the logics added in the design change process (engineering change process), at the time point when only the logics are changed, the relevant cell is not yet arranged (formed) and the relevant net is not yet provided (formed) on the layout data. Therefore, by overwriting (updating) the relevant layout data, the cell and the net are arranged and provided (see (3) net list change and (4) layout change of FIG. 2).

Then, at an appropriate timing near the tape out timing, the bulk fixing is performed in which all the cells are fixed.

In this bulk fixing, the EC bulk cells are embedded into surplus (vacant) regions of the layout data after the arrangement of the cells is completed in the layout data to realize the logics that are realized in the net list.

After the bulk fixing, both the movement of the logic cell arranged (formed) in the layout data to realize the logics that are realized in the net list and the movement of the EC bulk cell arranged (formed) after the logic cell is arranged (formed) as described above are prohibited.

Herein, the term the "EC bulk cell (actually the EC site described below)" refers to a cell including the transistor devices but does not include the net as the wirings to be provided (formed) between the transistor devices. Therefore, by providing (forming) the metal wiring of the EC cell on the EC bulk cell so as to perform wiring between the transistor devices, the design-change logic cell may be generated.

Herein, the prohibition of movement of the cell may be achieved as follows.

Namely, when it is detected that the EC bulk cell is already arranged (formed) in the layout data, based on the function of the packaging design supporting program for a semiconductor integrated circuit according to an embodiment of the present invention, the arrangement (positions) of the relevant cells are fixed and the lock control to prohibit the movement of the cells is performed.

As described above, after the bulk fix is performed, basically, the movement of all the cells is prohibited. However, as described above, only the design change of the design-change logic cell performed by providing (forming) the EC cell (i.e., a metal wiring pattern) on the EC bulk cell is exceptionally allowed.

Therefore, after the bulk fix is performed, the logic change performed by using the design-change logic cell is allowed. The EC cell is controlled by a computer using a function of the packaging design supporting program for a semiconductor integrated circuit in a manner such that the EC cell can be arranged (formed) only on the EC bulk cells.

The packaging design supporting method according to an embodiment of the present invention, achieved by causing a computer to execute the packaging design supporting program for a semiconductor integrated circuit, includes the following processes (steps).

1) When an operator inputs an instruction to perform the bulk fix to a computer to execute the packaging design supporting program for a semiconductor integrated circuit according to an embodiment of the present invention, first, a function of the program is performed so as to determine whether it is in a status where the bulk fix is allowed to be performed. To that end, the computer executing the packaging design supporting program determines whether there is any cell remaining that is to be arranged but is not arranged yet (not-yet arranged cell).

2) During the bulk fix, the EC bulk cells are arranged (formed) to be embedded into the surplus (vacant) regions in the sites.

3) After the arrangement of the EC bulk cell is completed, by inputting an explicit instruction to the computer executing the packaging design supporting program, the name is changed from the EC bulk cell to the EC site.

4) In a case where the existence of the EC site is detected in the site by the function of the program, the control to be performed after the bulk fix, (i.e., the control to prohibit the change in the bulk layer) is performed.

5) Further, in the control to prohibit the change in the bulk layer performed by the function of the program, the control is performed in a manner such that the change of the cell other than the design-change logic cell is prohibited. However, there is an exception described below (in 8)).

6) The EC cell is allowed to be arranged (formed) in the EC site only. Further, the control is performed so that the movement of the EC cell from an EC site to another EC site is allowed.

7) As described, the EC cell is allowed to be arranged in the EC site and moved between the EC sites. To make it easier for the operator to recognize the relevant regions (EC sites), the display control of the menu is performed so that the color of the relevant regions is different from that of the other regions.

8) As the exception in the above process, the logic cells are allowed to be exchanged as long as a flip direction and a rotation direction of the logic cells exchanged are the same as each other.

Herein, the term "flip direction" refers to a direction which is either where the logic cell or the design-change logic cell formed symmetrically is originally arranged without being reversed or where the logic cell or the design-change logic cell formed symmetrically is reversed (in flip arrangement).

Further, the term "rotation direction" refers to a direction which is either where the logic cell or the design-change logic cell is originally arranged without being rotated by 180 degrees or where the logic cell or the design-change logic cell is arranged by being rotated by 180 degrees.

In a case where the flip direction and the rotation direction of the logic cells exchanged with each other are the same direction as each other, when the logic cells are exchanged with each other, it is not necessary to change the bulk layer of the moved logic cells, namely, it is not necessary to change the arrangement of the transistor device of the logic cells.

In this case as well, to make it easier for the operator to recognize the logic cells that can be mutually exchanged as described above, the control of the menu is performed in a manner such that, when a logic cell is selected by the operator, the displayed color indicating the logic cells that can be mutually exchanged with the selected logic cell is changed.

9) Further, the control is performed to allow the exchange of the logic cells that can be mutually exchanged with each other as described above by a function of a so-called cell arrangement editor as a function of the program. Further, the control is performed in a manner such that, when the logic cells are exchanged with each other, the flip direction and the rotation direction of the moved logic cells are maintained in the respective destination positions.

10) When the arrangement of the logic cell is changed after the bulk fix is performed, in order to make sure that the change of the bulk layer (i.e., the change of arrangement of the transistor device of the logic cell or the design-change logic cell) has been occurred, it is determined whether each of the logic cells in all the regions on which the bulk fix is performed is the design-change logic cell. Then, a process is performed that, when determining that the logic cell is the cell other than the design-change logic cell, it is further determined whether the logic cell has not been changed after the bulk fix is performed. On the other hand, when determining that the logic cell is the design-change logic cell, it is further determined whether the EC bulk cell of the design-change logic cell has not been changed after the bulk fix is performed.

In a configuration of the packaging design supporting method according to an embodiment of the present invention, it may become possible to change the design during a time period from when the layout data are transferred to the manufacturing division (plant) of the semiconductor integrated circuit after the bulk fix is performed to when the tape out is performed. Further, it may become possible to perform the lock control in a manner such that the change of the bulk layer (i.e., the change of the arrangement of the transistor device of the logic cell) is to be prohibited in the design change process. Because of this feature, it may become possible to effectively prevent the operator and designer or the like from wrongly operating to change the bulk layer (i.e., the change of the arrangement of the transistor device of the logic cell).

Further, even after the bulk fix is performed, it may become possible to allow the design change using the design-change logic cell, and it may become possible to allow the exchange of the logic cells other than the design-change logic cell as long as determining that the flip direction and the rotation direction of the exchanged logic cells other than the design-change logic cells are maintained after the exchange. Because of this feature, a degree of freedom in improving the design of the semiconductor integrated circuit may be enhanced.

In the following, an embodiment of the present invention is described in detail with reference to the accompanying drawings.

Figure 3:
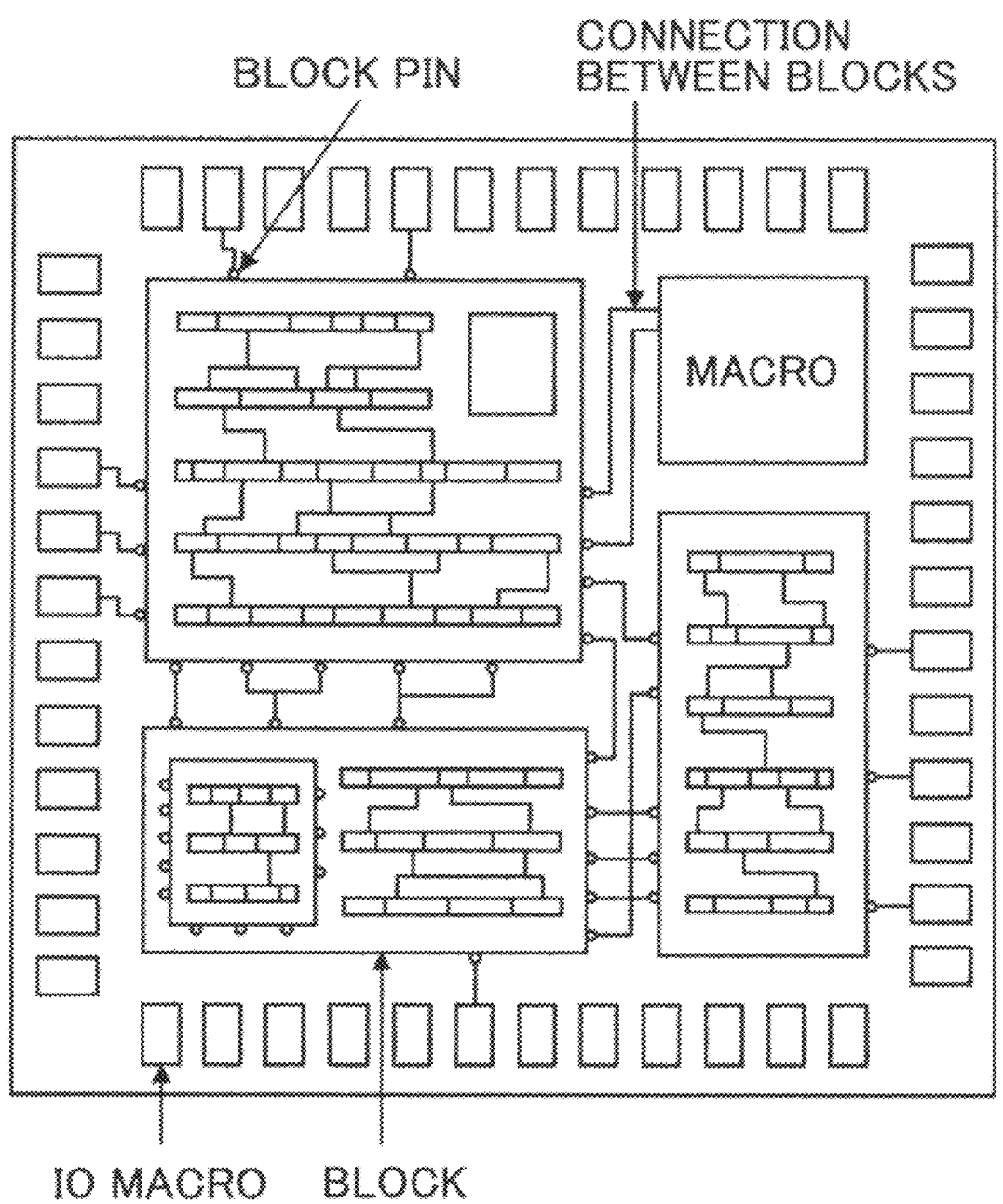
FIG. 3 is a drawing illustrating an exemplary configuration of a semiconductor integrated circuit.

FIG. 3 is a top view that illustrates an exemplary configuration of a semiconductor integrated circuit to which the packaging design supporting method according to an embodiment of the present invention may be applied, the semiconductor integrated circuit having a known hierarchical layout.

The logic circuit of the semiconductor integrated circuit is divided into blocks depending on the functions. Each block includes a logic circuit to realize the function, and the logic circuit includes a logic cell (i.e., an instance which is an entity of the logic cell) and a wiring between the logic cells (i.e., a net which is connection information) to realize the function. In FIG. 3, the term "MACRO" (including the IO MACRO) refers to a custom macro including circuits as the blocks, the circuits having the respective specific functions such as a RAM macro and a calculator macro.

Figure 4:
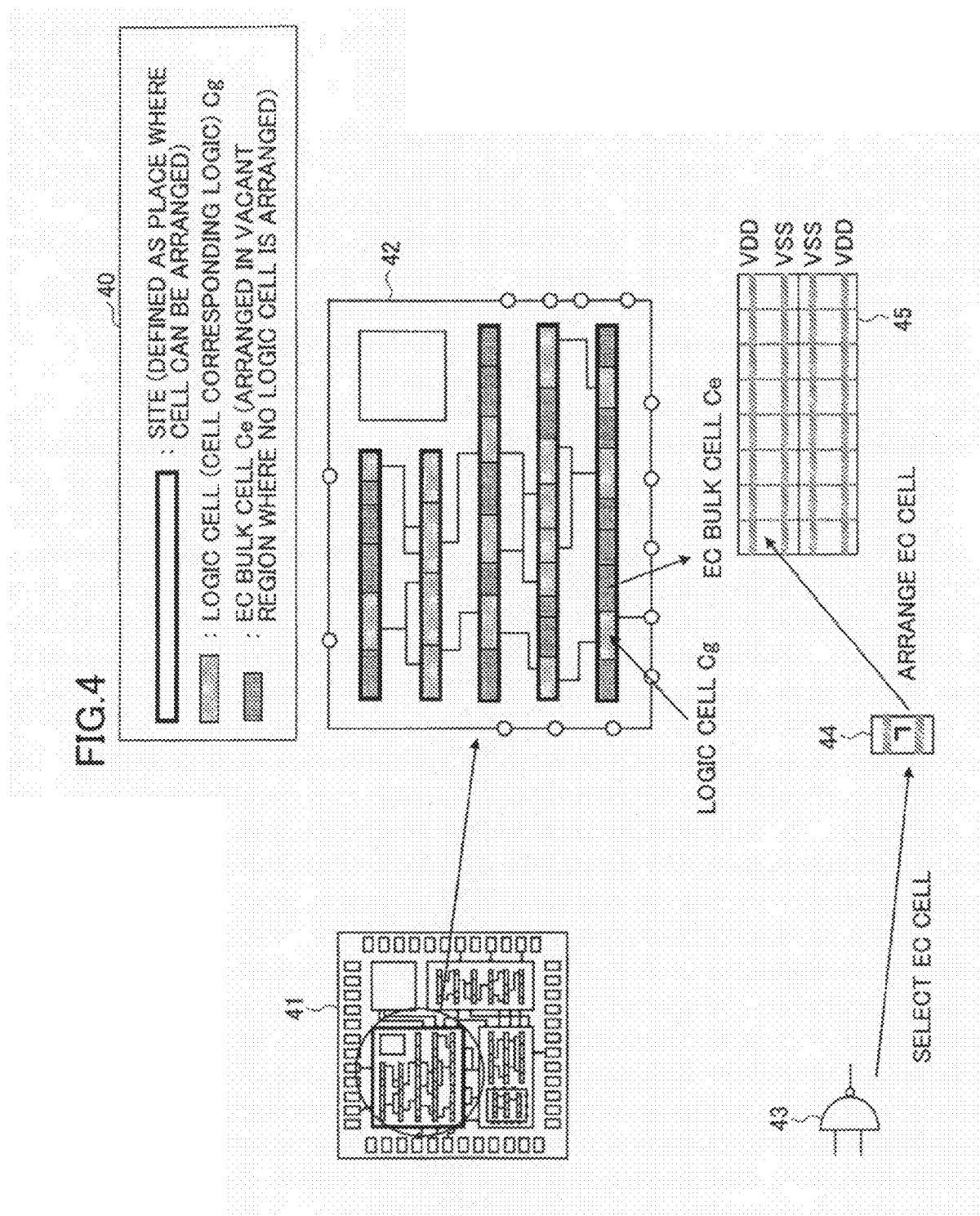
FIG. 4 is a drawing illustrating an arrangement of logic cells and EC bulk cells in packaging design of a semiconductor integrated circuit.

Panel 42 of FIG. 4 is a partially enlarged drawing illustrating a circled part in panel 41 of FIG. 4, namely one logic circuit of the semiconductor integrated circuit.

As illustrated in panel 42 in FIG. 4, in the block of the logic circuit of the semiconductor integrated circuit, there is provided a site in which the logic cells of the logic circuit are arranged. In the layout design process of the semiconductor integrated circuit, a logic cell Cg which is necessary to realize the logic circuit indicated in the net list is arranged in this site.

The site in which the logic cell Cg is to be arranged includes plural rows (five rows are included in the block of the logic circuit of the panel 42 in FIG. 4). Further, each row of the site includes two divided parts (upper and lower parts) as illustrated as enlarged in panel 45 of FIG. 4 as an example of the EC bulk cell. Further, as illustrated in the panel 45 of FIG. 4, each part includes a power line VDD and a ground line VSS.

Further, in the layout design process, a necessary logic cell is arranged in the relevant upper and lower parts of the row of the site. In the example of the configuration of the EC bulk cell Ce illustrated as enlarged in panel 45 in FIG. 4, there are provided a configuration in which eight logic cells may be stored in each of upper and lower parts.

Further, in the layout design process, after the arrangement of all the logic cells Cg are completed, the logic cells Cg being realized in the net list relevant to the block of the semiconductor integrated circuit, the bulk fix is performed. Then, as illustrated in panel 42 in FIG. 4, the EC bulk cell Ce is arranged in the vacant region in the site when the bulk fix is performed.

As illustrated in FIG. 4, and as described above, even after the bulk fix is performed, the EC cell as the wiring between transistor devices of the EC bulk cell Ce may be arranged (formed). By doing this, even after the bulk fix is performed, the design-change logic cell to be used as a new cell may be arranged in the block of the logic circuit of the semiconductor integrated circuit. By doing in this way, it may become possible to change the logic in the block of the logic circuit within a predetermined area.

A circuit symbol 43 in FIG. 4 illustrates a circuit symbol of the design-change logic cell (in this case, a logic cell constituting a NAND circuit) which is to be generated by arranging the EC cell. Further, an EC cell 44 in FIG. 4 illustrates the EC cell as the metal wiring to generate the design-change logic cell. Further, panel 45 in FIG. 4 illustrates the partially enlarged EC bulk cell Ce illustrated.

Figure 5:
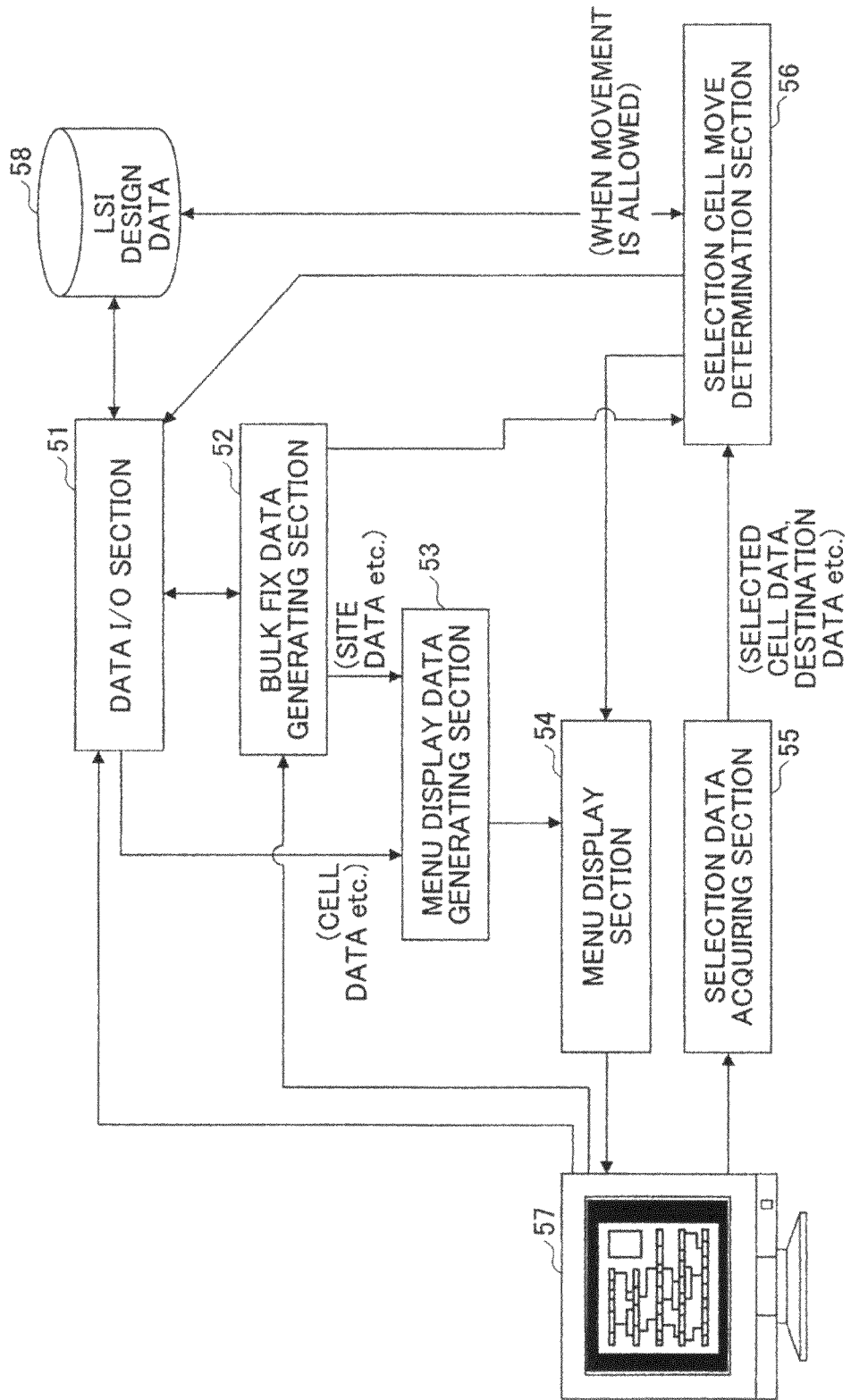
FIG. 5 is a functional block diagram illustrating an exemplary configuration of a packaging design supporting program for a semiconductor integrated circuit according to an embodiment of the present invention.

FIG. 5 is a functional block diagram of the packaging design supporting program for a semiconductor integrated circuit capable of causing a computer to execute the packaging design supporting method according to this embodiment of the present invention.

As illustrated in FIG. 5, the program includes a data I/O (input/output) section 51, a bulk fix data generating section 52, a menu display data generating section 53, a menu display section 54, a selection data acquiring section 55, and a selection cell move determination section 56.

The data I/O section 51 generates the net list and layout data relevant to the packaging design of the semiconductor integrated circuit based on an instruction input by an operator of the designer via an operational section (i.e., keyboard or the like) of a computer 57 on which the program is installed. Further, as illustrated in FIG. 5, the data I/O section 51 stores the net list and the layout data as LSI design data into a data storage section 58.

Further, the data I/O section 51 outputs the LSI design data (i.e., layout data and the like relevant to the packaging design of the logic circuit of the semiconductor integrated circuit) stored in the storage section 58 so that the LSI design data can be used displayed on a display of the computer 57 via the menu display data generating section 53 and the menu display section 54.

The bulk fix data generating section 52 generates bulk fix data when an instruction indicating that the bulk fix is to be performed is input by the operator via the data I/O section 51.

Herein, the term "bulk fix data" refers to arrangement information of the sites as the layout data of the block of the logic circuit of the semiconductor integrated circuit when the bulk fix is performed. More specifically, for example, in the case of the block of the logic circuit illustrated in the panel 42 of FIG. 4, the bulk fix data includes information indicating whether the EC bulk cell Ce or the general logic cell Cg is arranged for each cell arranged in all the five rows of the sites.

The menu display data generating section 53 generates a menu display data to be displayed on the display of the computer 57 based on the layout data supplied from the data I/O section 51 and the bulk fix data supplied from the bulk fix data generating section 52 and the like.

The menu display section 54 displays data on the display of the computer 57 based on the menu display data supplied from the menu display data generating section 53.

The selection data acquiring section 55 acquires information indicating the cell selected by the operator, a move destination cell of the selected cell (i.e., a position of the cell to which the selected cell is moved) and the like based on an instruction information input by the operator via the operational section of the computer 57, and transfers the acquired information to the selection cell move determination section 56.

The selection cell move determination section 56 receives the information based on the instruction input by the operator from the selection data acquiring section 55, and determines whether the design change based on the instruction is prohibited. This determination whether the design change based on the instruction is prohibited is described in detail below with reference to FIGS. 9, 13, and the like.

Figure 6:
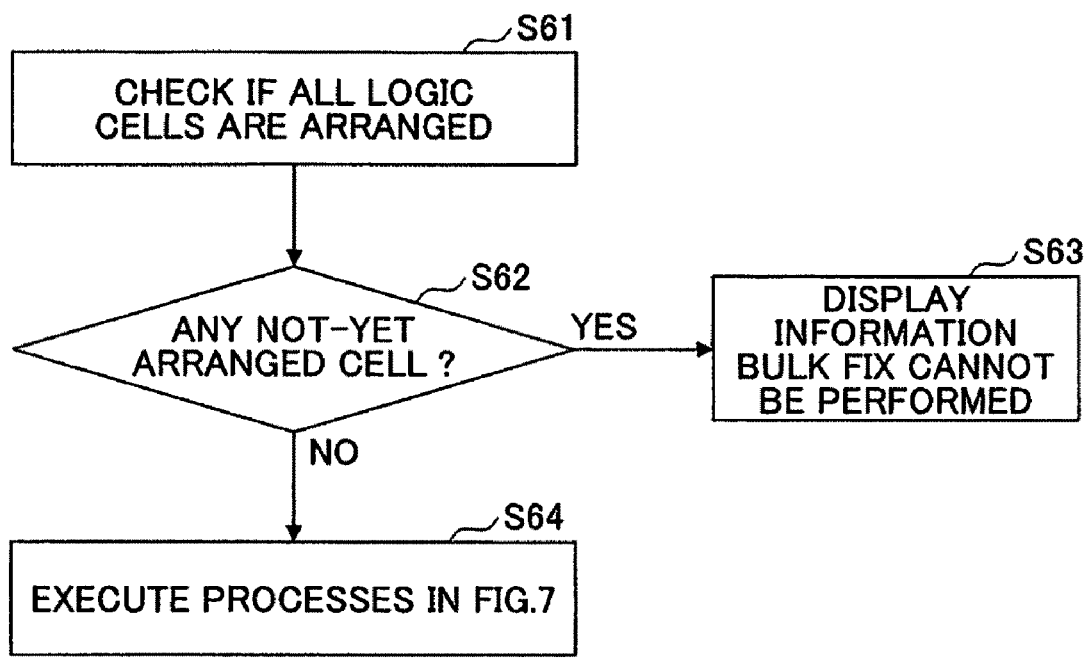
FIG. 6 is a first flowchart illustrating an exemplary process of a packaging design supporting method for a semiconductor integrated circuit according to an embodiment of the present invention.

FIG. 6 is a flowchart illustrating a flow of a process executed by the bulk fix data generating section 52 when an instruction to perform the bulk fix is input to the computer 57 by the operator in the packaging design supporting program for a semiconductor integrated circuit according to this embodiment of the present invention as described with reference to FIG. 5.

First, in step S61 of FIG. 6, it is determined whether all the logic cells to be arranged in the site are already arranged (i.e., whether all the instances and the nets in the relevant net list are reflected in the layout data).

Next, in step S62, as a result of the determination in step S61, when the result indicates that there is a cell that has not been arranged (not-arranged cell) in the site yet (YES in step S62), the process goes to step S63, where the information indicating that the bulk fix cannot be performed due to the existence of the not-arranged cell is displayed on the display of the computer 57 via the menu display data generating section 53 and the menu display section 54.

Based on the information on the display of the computer 57, the operator may recognize the existence of the not-arranged cell, so that the operator may complete arranging the logic cells in the site by inputting the instruction via the operational section of the computer 57.

On the other hand, when the result indicates that there is no not-arranged cell (NO in step S62), the process goes to step S64, where a process described below with reference to FIG. 7 is performed.

The process illustrated in FIG. 7 is consecutively executed by the bulk fix data generating section 52 after the process of FIG. 6. This process of FIG. 7 is to arrange the EC bulk cell described above in a region where nothing is arranged in the site (vacant region in site). This process is preformed on the layout data relevant to the packaging design of the semiconductor integrated circuit.

Data in the left-hand side FIG. 7A corresponds to panel 41 in FIG. 4. In this case, FIG. 7A illustrates a status where there is no not-arranged cell (NO in step S62) as a result of determination in step S62. Further, the left-hand side of FIG. 7A illustrates a status where the logic cells Cg included in the net list are arranged in five rows of the sites extending in the lateral directions in the figure, and wirings w are also provided (formed) between the logic cells Cg.

On the other hand, the right-hand side of FIG. 7A illustrates a status where the EC bulk cells Ce are arranged (embedded) in the regions where no logic cells Cg are arranged in the sites in the status illustrated in the left-hand side of FIG. 7A.

As illustrated in FIG. 7A, upon receiving the instruction to perform the bulk fix from the operator, the bulk fix data generating section 52 of the packaging design supporting program for a semiconductor integrated circuit according to this embodiment of the present invention performs the process of FIG. 6 to determine (ensure) that there is no not-arranged cell, and further performs the arrangement process of FIG. 7A to embed (arrange) the EC bulk cells Ce in the regions where no logic cells Cg are arranged in the sites.

Next, the bulk fix data generating section 52 performs a process described in detail below with reference to FIG. 8 to generate the EC sites Se (see FIG. 7B) in the layout data.

As described in detail below, FIG. 7B illustrates a status where the EC sites are generated with respect to (at the positions of) the EC bulk cells Ce that have been arranged in the vacant regions in the sites in the status illustrated in FIG. 7A, so that the EC bulk cells are replaced by the EC sites Se.

Figure 8:
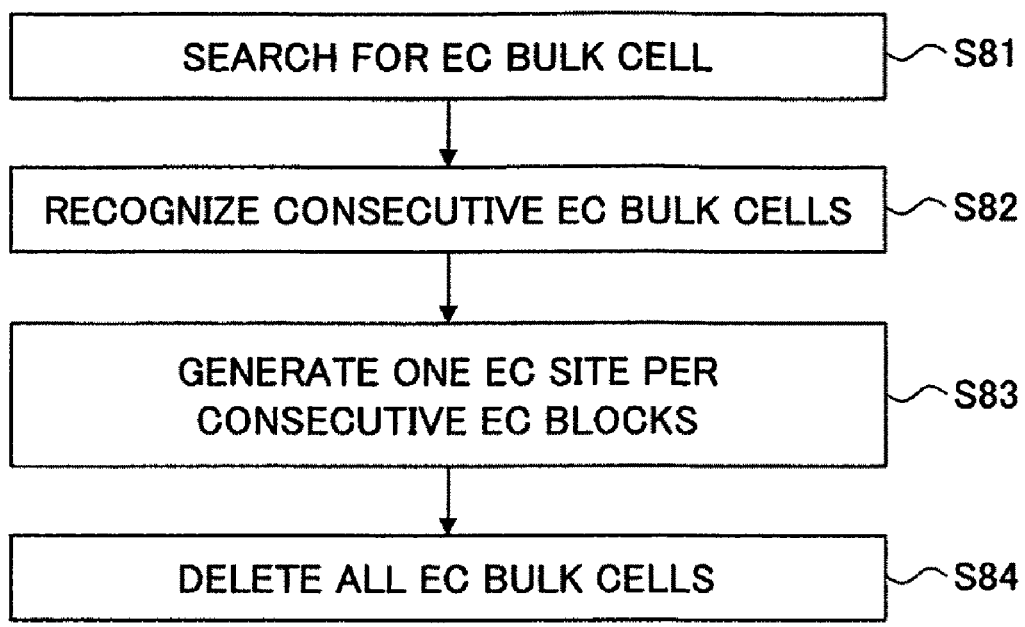
FIG. 8 is a second flowchart illustrating an exemplary process of a packaging design supporting method for a semiconductor integrated circuit according to an embodiment of the present invention.

First, in step S81 of FIG. 8, the EC bulk cell arranged in the sites as described above is searched for with respect to the layout data of the block of the logic circuit relevant to the packaging design of the semiconductor integrated circuit.

Next, in step S82, if there are consecutively arranged EC bulk cells that have been searched for in step S81, the fact of the consecutively arranged EC bulk cells is recognized. For example, in the uppermost row of the site in the right-hand side of FIG. 7A, the second through the fourth EC bulk cells from the right end are mutually consecutive. In such a case, it is recognized that the EC bulk cells Ce are consecutively arranged.

Next in step S83, a single EC site Se is generated for such consecutive EC bulk cells Ce. For example, in this case, a single EC site Se is generated for three EC bulk cells which are the second through the fourth EC bulk cells from the right end in the uppermost row of the site in the right-hand side of FIG. 7A.

On the other hand, when there is one EC bulk cell Ce which is separated from any other EC bulks and no other EC bulk cell is consecutively arranged next to the EC bulk cell Ce, a single EC site Se is generated for this single EC bulk cell Ce separated from any other EC bulk cells Ce. For example, in this case, a single EC site Se is generated for a single EC bulk cell which is the first EC bulk cell from the left end in the uppermost row of the site in the right-hand side of FIG. 7A, the first EC bulk cell being separated from any other EC bulk cells.

Next, in step S84, after the EC sites Se are generated for all the EC bulk cells as described above in step S83, all the data of the EC bulk cells Ce are deleted. Namely, in the layout data, the data of the EC bulk cells Ce are replaced by the data of the Ec sites Se.

After the process described above with reference to FIG. 8 is completed, the process goes to the process illustrated in FIG. 9. Briefly, this process of FIG. 9 is to perform the bulk fix while the lock control as described above is performed.

First, in step S91 of FIG. 9, the bulk fix data generating section 52 (in FIG. 5) refers to the layout data stored in the storage section 58 (in FIG. 5), the layout data being included in the LSI design data of the block of the logic circuit, and determines (confirms) that the EC sites Se are arranged (set) in the sites in the layout data. Next, in step S92, the bulk fix data generating section 52 (in FIG. 5) performs the bulk fix. Namely, the bulk fix is performed on the layout data.

Once the bulk fix is performed in this way, the layout data of the block of the logic circuit is transferred to the manufacturing division of the semiconductor integrated circuit, so that the manufacturing division can start manufacturing the bulk layer of the semiconductor substrate of the semiconductor integrated circuit.

On the other hand, after the bulk fix is performed, the operator and designer perform design changes to improve (adjust) the operation timing (such as delay amount) in the block of the logic circuit, correct a logical error and the like.

In this case, as described above, in the packaging design of the semiconductor integrated circuit, the bulk fix is performed after all the logic cells Cg are arranged, the logic cells Cg constituting the logic circuit based on the net list of the block of the logic circuit.

Referring back to the process of FIG. 9, in step S93, where when the operator performs an operation to select a target cell via the operational section of the computer 57 (in FIG. 5) to perform the design change after the bulk fix, the selection data acquiring section 55 (in FIG. 5) extracts the data of the operation and transfers the extracted data to the selection cell move determination section 56 (in FIG. 5).

The selection cell move determination section 56 (in FIG. 5) acquires data indicating the type of the cell relevant to the selection (the target cell) by referring to the LSI design data stored in the storage section 58 (in FIG. 5). Herein, the term "acquire data indicating the type of the cell" refers to its being determined whether the cell is the design-change logic cell.

Next, in step S94, when determining that the result in step S93 indicates that the cell is not the design-change logic cell (NO in step S94), the process goes to step S95, where an information indicating that the cell is not allowed to be moved because the cell is not the design-change logic cell is displayed in the menu on the display of the computer 57 (in FIG. 5) via the menu display section 54 (in FIG. 5).

By referring to the information on the display of the computer 57 (in FIG. 5), the operator may recognize that the cell selected by the operator is not the design-change logic cell and that due to the bulk fix, the cell is prevented from being moved. As a result, it may become possible to effectively prevent a cell from being moved by the operator, the cell being other than the design-change logic cell and having been fixed in its position (arranged) after the bulk fix is performed.

Herein, the "cell other than the design-change logic cell" includes the general logic cell as described above and the cell other than the design-change logic cell and the logic cell. The cell other than the design-change logic cell and the logic cell such as a cell in a custom macro block, that cannot be a target cell to be selected (i.e., changed) in the design change.

As described above, the general logic cell Cg other than the design-change logic cell is necessary to realize (configure) the logic circuit included in the net list, so that the fundamental characteristics of the logic circuit may heavily depend on the general logic cell Cg. Because of this feature, detail specifications based on the general logic cells are typically optimized already. Therefore, it is to be prohibited to move the general logic cell Cg other than the design-change logic cell after the bulk fix is performed.

Further, the term "design-change logic cell" refers to a cell that is generated by providing (forming) the EC cell on the EC site Se as described above. Basically, after the bulk fix is performed, only the design-change logic cell is allowed to be moved in the design change process.

Referring back of FIG. 9, after the process of step S95 is performed, the process goes back to step S93, where when the operator performs the operation to select a target cell via the operational section of the computer 57 (in FIG. 5) to perform the design change, the selection data acquiring section 55 (in FIG. 5) extracts the data of the operation and transfers the extracted data to the selection cell move determination section 56 (in FIG. 5).

Then, the determination in step S94 is performed. When determining that the result is NO, the process goes to step S95 to repeat the process described above.

On the other hand, when the result of the determination in step S94 is YES, namely when determining that the target cell selected by the operator is the design-change logic cell, the process goes to step S96.

In step S96, the selection cell move determination section 56 acquires the positional information of the destination of the movement of the cell via the selection data acquiring section 55 (in FIG. 5) based on the operation to designate the destination of the cell performed by the operator.

Next, in step S97, the selection cell move determination section 56 (in FIG. 5) determines whether the destination position of the cell corresponds to the EC site Se in the layout data included in the LSI design data by referring to the LSI data stored in the storage section 58 (in FIG. 5).

When determining that the destination position of the cell does not correspond to the EC site Se (NO in step S97), the process goes to step S98, where information indicating that the movement (arrangement) of the cell is prohibited because the destination of the movement of the cell does not correspond to the EC site Se being displayed on the menu of the display of the computer 57 (in FIG. 5) via the menu display section 54 (in FIG. 5).

By referring to the information on the display of the computer 57 (in FIG. 5), the operator may recognize that the destination does not correspond to the EC site Se and that due to the bulk fix, the cell is prevented from being moved to the destination position. As a result, it may become possible to effectively prevent the operator from moving the cell to the position other than the EC site Se in the design change process.

As described above, after the bulk fix is performed, basically, only the arrangement of the design-change logic cell by arranging (forming) the EC cell on the EC site Se and the movement of the design-change logic cell between the EC sites of the EC cells are allowed to be performed.

Referring back to FIG. 9, after the process of step S98 is performed, the process goes back to step S93, where when the operator performs the operation to select a target cell and input the destination of the cell via the operational section of the computer 57 (in FIG. 5), the selection data acquiring section 55 (in FIG. 5) extracts the data of the operation and transfers the extracted data to the selection cell move determination section 56 (in FIG. 5).

After that, the processes of steps S94 through S96 are performed. When determining that the result is NO in step S94 and step S96, the process goes to step S95 and step S98, respectively. Then, the same process described above is repeated.

On the other hand, when determining that the results are YES in both steps S94 and S96, namely when determining that the cell selected by the operator is the design-change logic cell and that the destination of the movement of the cell corresponds to the EC site, the process goes to step S99

In step S99, the selection cell move determination section 56 (in FIG. 5) transfers the information to the data I/O section 51 (in FIG. 5), the information indicating the selected cell and the destination of the movement of the cell based on the operation performed by the operator. Then, the data I/O section 51 (in FIG. 5) changes the data of the layout data (as design change) included in the LSI design data stored in the storage section 58 (in FIG. 5) in accordance with the received information indicating the selected cell and the destination of the movement of the cell.

As described above, in the packaging design supporting method according to this embodiment of the present invention, after the bulk fix is performed, basically, only the arrangement of the design-change logic cell by arranging (forming) the EC cell on the EC site Se and the movement of the design-change logic cell between the EC sites of the EC cells are allowed to be performed, and any other process of design change is prohibited.

Further, when any prohibited operation is attempted, information indicating that the design change of this operation is prohibited is displayed on the menu of the display. As a result, the operator may recognize the meaning of the information, and it may become possible to effectively prevent the operator from wrongly operating any prohibited design change.

Figure 10A:
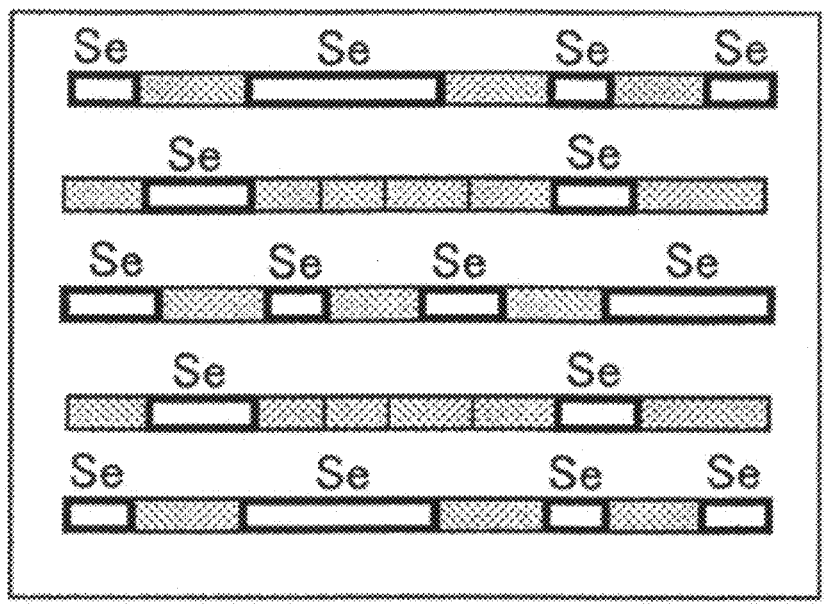
FIGS. 10A and 10B are second drawings illustrating an exemplary process of a packaging design supporting method for a semiconductor integrated circuit according to an embodiment of the present invention.
Figure 10B:
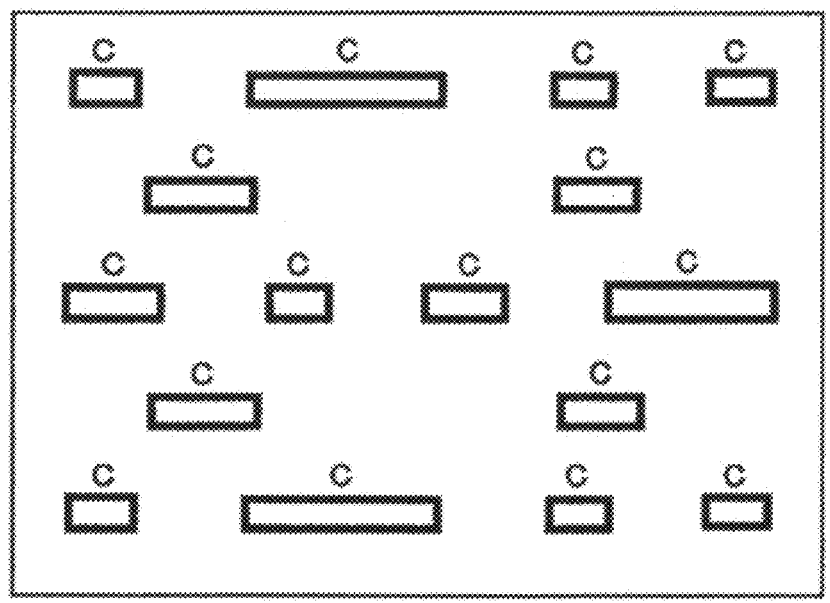
Figure 11:
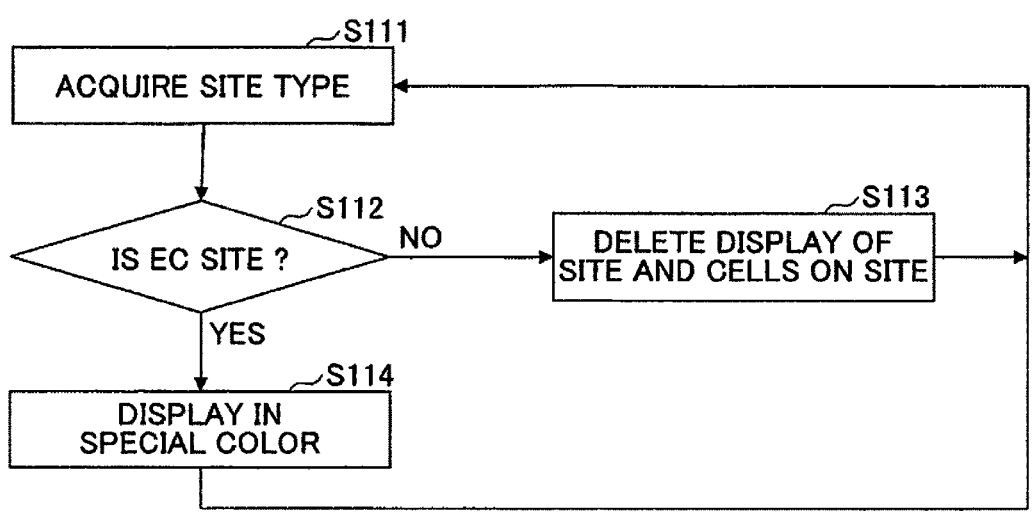
FIG. 11 is a fourth flowchart illustrating an exemplary process of a packaging design supporting method for a semiconductor integrated circuit according to an embodiment of the present invention.

Next, with reference to FIGS. 10A, 10B, and 11, a process is described of displaying the EC sites Se using a special color so that the operator can recognize the EC sites Se more easily when the layout data including the EC sites Se is displayed in the menu on the display of the computer 57 (in FIG. 5).

Herein, the term the "special color" refers to a color capable of highlighting (emphasizing) the EC sites Se in the display to attract human attention by, for example, having higher brightness than any other colors used in parts other than the EC sites Se or by reversing the hue of the color.

This process using the special color is collectively performed by the bulk fix data generating section 52, the menu display data generating section 53, and the menu display section 54 in FIG. 5.

In this embodiment, as illustrated in FIGS. 10A and 10B, the EC sites Se illustrated in FIG. 10A are highlighted (emphasized) by using the special color in the areas c in FIG. 10B, so that the operator can easily recognize the areas c (i.e., EC sites Se).

To that end, in step S111 of FIG. 11, the data I/O section 51 (in FIG. 5) detects the EC site Se from the entire corresponding sites based on the layout data of the LSI design data stored in the storage section 58 (in FIG. 5).

As a result of step S111, with respect to the sites other than the EC sites (non-EC sites), the data I/O section 51 (in FIG. 5) causes (controls) the menu display data generating section 53 (in FIG. 5) not to display the non-EC sites and the cells on the non-EC sites on the display as illustrated in FIG. 10B (step S113 after NO in step S112).

Under this control, upon generating display data of the layout data, the menu display data generating section 53 (in FIG. 5) generates the display data excluding the non-EC sites and the cells on the non-EC sites.

Then, based on the display data generated by the menu display data generating section 53 (in FIG. 5), the menu display section 54 (in FIG. 5) controls the display of the computer 57 (in FIG. 5) to display the layout data in a manner such that the non-EC sites and the cells on the non-EC sites are not to be displayed.

On the other hand, with respect to the EX sites Se detected in step S111, the data I/O section 51 (in FIG. 5) performs control to display the EC sites Se in the special color as illustrated in FIG. 10B (step S114 after YES in step S112).

Under this control, upon generating display data of the layout data, the menu display data generating section 53 (in FIG. 5) generates the display data so that the EC sites Se are displayed in the special color.

Then, based on the display data generated by the menu display data generating section 53 (in FIG. 5), the menu display section 54 (in FIG. 5) controls the display of the computer 57 (in FIG. 5) to display the layout data in a manner such that the EC sites Se are displayed in the special color.

As is described, FIG. 10B illustrates an example of the displayed layout data generated as described above. As illustrated in FIG. 10B, the areas c (i.e., EC sites Sc) are displayed in the special color, and any other sites other than the EC sites Sc (i.e., non-EC sites) and the cells on the non-EC sites are not displayed.

As described above, after the bulk fix is performed, the bulk data are transferred to the manufacturing division of the semiconductor integrated circuit, so that the manufacturing the bulk layer is started. Therefore, basically, the design change of the sites other than the EC sites Se is to be prohibited. In the packaging design supporting method according to this embodiment of the present invention, as described above, the layout data are displayed in a manner such that only the EC sites Se are displayed in the special color, and the non-EC sites and the cells on the non-EC sites are not displayed. As a result, the operator may easily recognize the EC sites Se that can be selected in design change, thus enabling enhancing the efficiency in the design change operation after the bulk fix is performed.

Figure 12A:
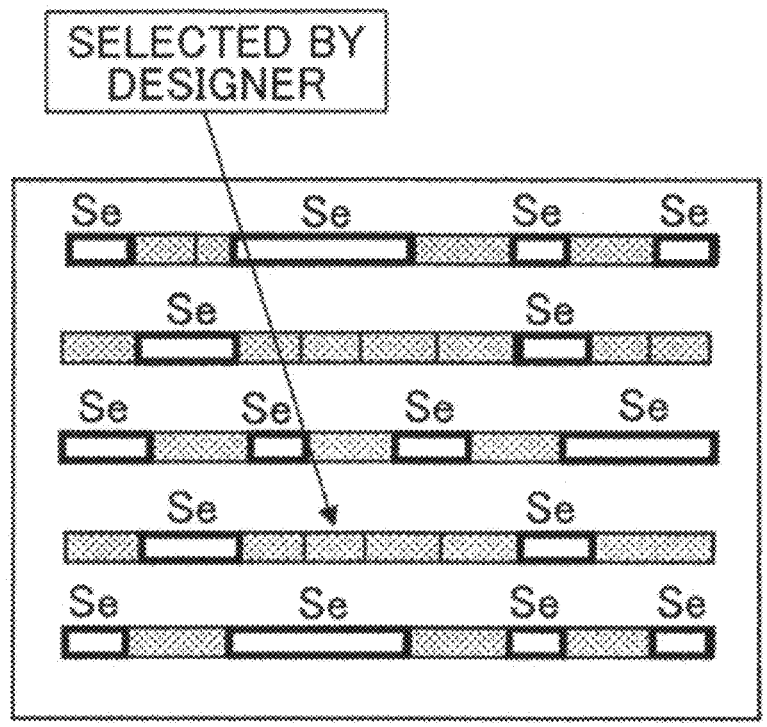
FIGS. 12A and 12B are third drawings illustrating an exemplary process of a packaging design supporting method for a semiconductor integrated circuit according to an embodiment of the present invention.
Figure 12B:
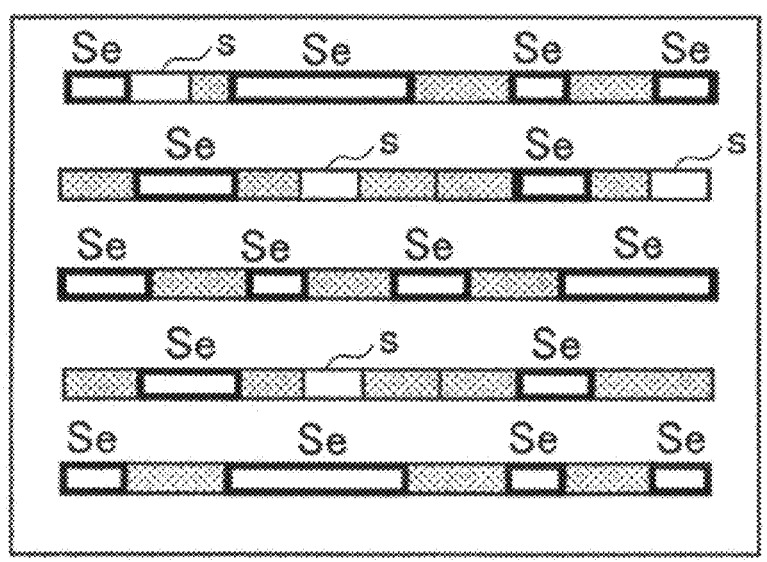

Next, a case is described where a logic cell other than the design-change logic cell is exceptionally allowed to be changed in the design change with reference to FIGS. 12A, 12B, and 13.

As described above, after the bulk fix is performed, basically, only the arrangement of the design-change logic cell by arranging (forming) the EC cell on the EC site Se and the movement of the design-change logic cell between the EC sites of the EC cells are allowed to be performed in the design change process, and any other process (type) of design change is prohibited. Namely, after the bulk fix is performed, basically, a change of logic cell other than the design-change logic cell is prohibited.

As described above, this is because 1) after the bulk fix is performed, the manufacturing the bulk layer is started by the manufacturing division of the semiconductor integrated circuit. In this case, when the bulk (i.e., the arrangement of the transistor device of the cell) is changed, the bulk layer of the semiconductor substrate having been manufactured may not be modified based on the change of the bulk. Therefore, a problem of the time schedule of manufacturing the semiconductor integrated circuit may occur. In addition, 2) the general logic cell Cg other than the design-change logic cell is necessary to realize (configure) the logic circuit included in the net list, therefore detailed specifications based on the cells are typically optimized already when the bulk fix is performed.

However, if design change of the cell other than the design-change logic cell is strictly prohibited without any exception, the degree of freedom in the design change may be insufficient and logical errors may not be corrected. To overcome this inconvenience, in the packaging design supporting method according to this embodiment of the present invention, under a predetermined condition, the design change of a general logic cell other than the design-change logic cell is allowed. By allowing this, it may become possible to improve the degree of freedom in design change of the semiconductor integrated circuit.

More specifically, the exchange of the logic cells are allowed as long as the flip direction and the rotation direction of the exchanged logic cells at their respective destinations are maintained.

As described in detail below with reference to FIG. 14, in a case where the logic cells are exchanged, as long as the flip direction and the rotation direction of the logic cells at their respective destinations are the same as those before the exchange (maintained), it does not become necessary to change the arrangement of the transistor device of the logic cell and the wiring between the transistor devices in the logic cell; therefore, for example, it does not become necessary to change the bulk layer of the semiconductor integrated circuit after the bulk fix is performed.

Herein, as described in FIG. 12A, when the operator and designer selects the logic cell in the design change process, the selection cell move determination section 56 receives the data of the selected cell via the selection data acquiring section 55 (in FIG. 5). Then, the selection cell move determination section 56 (in FIG. 5) searches for all the logic cells that can be exchanged with the selected sell without changing any of the flip direction and the rotation direction of the exchanged logic cells at their respective destinations. Further, the selection cell move determination section 56 (in FIG. 5) displays areas in the special color via the menu display data generating section 53 (in FIG. 5) and the menu display section 54 (in FIG. 5), the area s (in FIG. 12B) corresponding to the searched-for logic cells.

As a result, after the bulk fix is performed, upon exceptionally performing the design change process on the general logic cell other than the design-change logic cell, the operator may easily recognize the logic cells that can be exchanged with the selected logic cell, thereby enabling enhancing the efficiency of the design change process. Further, it may become possible to effectively prevent the operator from wrongly selecting a logic cell that cannot be exchanged with the selected logic cell without changing any of the flip direction and the rotation direction of the exchanged logic cells at their respective destinations.

FIG. 13 is a flowchart illustrating the process as described with reference to FIG. 12.

First, in step S131 of FIG. 13, the selection cell move determination section 56 (in FIG. 5) receives the data of the instruction input by the operator via the operational section of the computer 57 (in FIG. 5) and the selection data acquiring section 55 (in FIG. 5), and acquire data indicating the type of the cell selected by the operator.

Next, in step S132, the selection cell move determination section 56 (in FIG. 5) determines whether the type of the acquired cell is the design-change logic cell. When determining that the type of the acquired cell is the design-change logic cell (YES in step S132), the process goes to step S133, where similar processes to those of steps S96 through S99 is performed. Namely, in this case, as is described, since the design-change logic cell is allowed to be changed (selected) in the design change process even after the bulk fix is performed, not the exceptional process described above but the design change process to be performed on the design-change logic cell as described with reference to FIG. 9 is preformed in step S133.

On the other hand, when determining that the type of the acquired cell is not the design-change logic cell (NO in step S132), the process goes to step S134, where the selection cell move determination section 56 further determines whether the type of the acquired cell is the general logic cell.

When determining that the type of the acquired cell is not the general logic cell, the acquired cell is neither the design-change logic cell nor the general logic cell other than the design-change logic. Therefore, originally, the acquired cell cannot be selected as the target cell in the design change process. Such a cell that should not be selected as the target cell in the design change process includes, for example, a cell included in a custom macro block.

Referring back to FIG. 13, when determining that the type of the acquired cell is not the general logic cell (NO in step S134), the process goes to step S135, where the selection cell move determination section 56 (in FIG. 5) controls to display an information on the menu on the display of the computer 57 (in FIG. 5) via the menu display section 54 (in FIG. 5), the information indicating that the movement (change) of the acquired cell is prohibited because the acquired cell is neither the design-change logic cell nor the general logic cell other than the design-change logic cell.

By referring the information in the menu on the display of the computer 57 (in FIG. 5), the operator may clearly recognize that the selected (acquired) cell is neither the design-change logic cell nor the general logic cell. As a result, it may become possible to effectively prevent the operator from wrongly selecting the cell that should not be selected in the design change process because the cell is neither the design-change logic cell nor the general logic cell.

Referring back to FIG. 13, after the process of step S135 is performed, the process goes back to step S131, where, similar to the above, when the operator operates the operational section of the computer 57 (in FIG. 5) to select the logic cell to attempt to change the design data of the cell in the design change process, the selection data acquiring section 55 (in FIG. 5) transfers the data of the selected cell based on the operation of the operator to the selection cell move determination section 56 (in FIG. 5).

After that, similar to the above, the determination in steps S132 is performed. When the result in step S132 is YES, the processes in steps S96 through S99 are performed again. On the other hand, when the result in step S132 is NO, the process goes to step S134. Then, when the result in step S134 is NO, the process goes to step S135, where the process described above is similarly performed.

On the other hand, when the result in step S134 is YES, namely when the cell selected by the operator is the general cell other than the design-change logic cell, the process goes to step S136.

In step S136, the selection cell move determination section 56 (in FIG. 5) searches for all the logic cells that can be exchanged with the selected sell without changing any of the flip direction and the rotation direction of the exchanged logic cells at their respective destinations when being exchanged.

Then, in step S137, the selection cell move determination section 56 (in FIG. 5) displays the searched-for cells in the special color in the menu on the display of the computer 57 (in FIG. 5) as illustrated in FIG. 12B via the menu display section 54 (in FIG. 5).

After that, in step S138, based on the operation performed by the operator selecting the cell as the destination of the exchange (move) of the selected (acquired) cell, the data I/O section 51 (in FIG. 5) reflects the data of the movement (exchange) of the cells in the layout data of the LSI design data stored in the storage section 58 (in FIG. 5).

Next, in the following, with reference to FIG. 14, a case is described where the logic cells can be exchanged without changing any of the flip direction and the rotation direction of the exchanged logic cells at their respective destinations.

Figure 14:
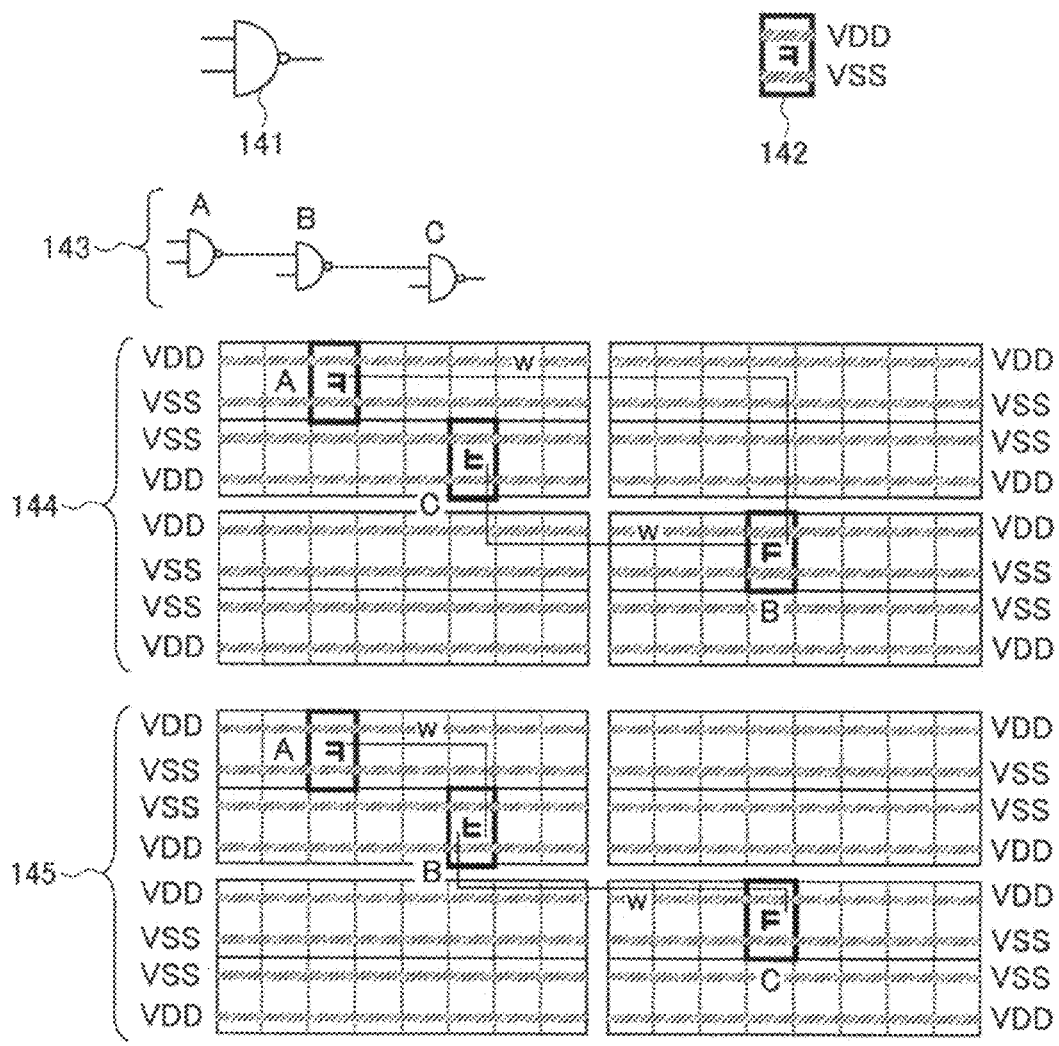
FIG. 14 is a fourth drawing illustrating an exemplary process of a packaging design supporting method for a semiconductor integrated circuit according to an embodiment of the present invention.

Panel 141 of FIG. 14 illustrates a NAND circuit as an example of the logic cell. On the other hand, FIG. 12B illustrates an example where the NAND circuit is arranged in the layout data.

In EC cell symbol 142, a symbol formed by reversing a letter "F" in the right-and-left direction schematically represent the shapes of wirings formed between transistor devices in the cell. However, such a symbol in FIGS. 14A and 14B is for simplification and explanatory purposes only.

Circuits 143 of FIG. 14 illustrates an example of the logic circuit using plural NAND circuits. On the other hand, panel 144 of FIG. 14 illustrates an example of the layout data in which the NAND circuits are realized (formed). In this example of the panel 144 in FIG. 14, three NAND circuits A, B, and C are arranged in the cells A, B, and C, respectively, and connected in series in this order.

Further, panel 145 of FIG. 14 illustrates an example of the logic circuit using those NAND circuits A, B, and C. However, this layout of the panel 145 in FIG. 14 differs from that of the panel 144 in FIG. 14 in that the cells B and C of the NAND circuits B and C, respectively, are exchanged with each other.

In the layout of the panel 144 in FIG. 14, a wiring w is formed from the cell A to the cell B to the right-hand direction, and another wiring w is formed from the cell B to the cell C to the left-hand direction, so that the wirings are formed back and forth.

On the other hand, in the layout of the panel 145 in FIG. 14, the cells B and C have been exchanged with each other compared with the layout of the panel 144 in FIG. 14. Due to this exchange, as illustrated in the panel 145 of FIG. 14, a wiring w is formed from the cell A to the cell B to the right-hand direction, and another wiring w is formed from the cell B to the cell C also to the right-hand direction. As a result, compared with the wirings in the layout of the panel 144 in FIG. 14, the total length of the wirings w is effectively reduced, thereby enabling improving the performance of the logic circuits.

In such a design change process, when comparing the layout in the panel 144 of FIG. 14 before the design change and the layout in the panel 145 of FIG. 14 after the design change, as illustrated in the figures, the shape of the wirings between the transistor devices in the cell C (i.e., in this case, the shape formed by reverting a letter "F" in the up-and-down direction) before the design change is maintained (the same as that) in the cell B after the design change.

In the same manner, the shape of the wirings between the transistor devices in the cell B (i.e., in this case, the shape of letter "F") before the design change is maintained (the same as that) in the cell C after the design change.

This fact that the shape of the wiring is maintained is equivalent to the fact that the flip direction and the rotation direction are maintained. Further, the term "flip" refers to reverse a cell having a symmetric shape.

Therefore, when the cell B and the cell C are exchanged with each other, the flip direction and the rotation direction of the cell C before the exchange which is the exchange destination of the cell B are maintained even after the cell C is exchanged with the cell B in this design change process.

Further, in this case, the flip direction and the rotation direction of the cell B before the exchange which is the exchange destination of the cell C are also maintained even after the cell B is exchanged with the cell C in this design change process. As a result, even after the exchange, the flip direction and the rotation direction of the exchanged logic cells at their respective destinations are maintained.

As described above, in a case where the logic cells are exchanged with each other due to the design exchange, when the flip direction and the rotation direction of the exchanged logic cells are maintained at their respective destinations, it does not become necessary to change the bulk (i.e., arrangement of the transistor devices) at the positions of the destinations of the exchanged cells. Because of this feature, after the bulk fix is performed, when the design change as described above is performed, it does not become necessary to go back to the process of manufacturing the bulk layer to manufacture the changed bulk layer of the semiconductor substrate.

In step S136 in FIG. 13, for example, when the operator selects the cell C in panel 144 of FIG. 14, the cell(s) is searched for that can be exchanged with the cell C without changing any of the flip direction and the rotation direction of the exchanged logic cells at their respective destinations when being exchanged. In this case, the cell B is searched for and is displayed in the special color as described with reference to FIG. 12B.

Figure 15:
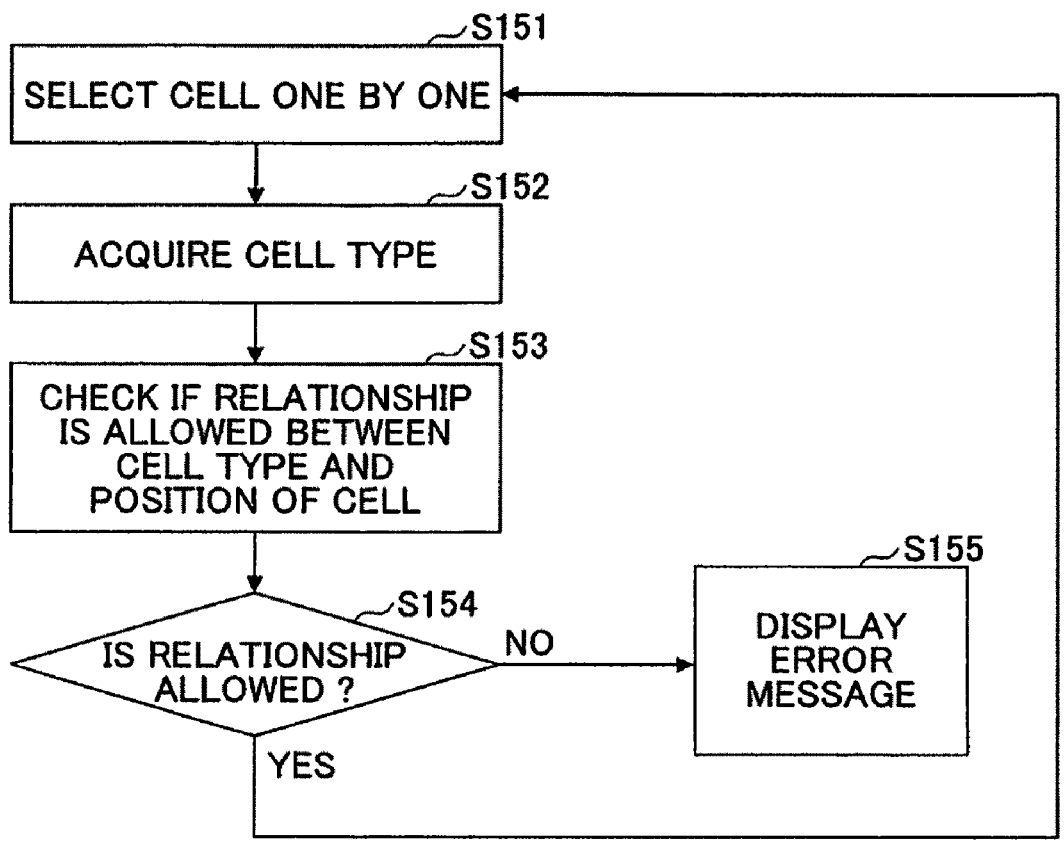
FIG. 15 is a sixth flowchart illustrating an exemplary process of a packaging design supporting method for a semiconductor integrated circuit according to an embodiment of the present invention.

Next, with reference to FIG. 15, a check process is described that is performed after the design change process after the bulk fix is performed and that is performed before the tape out of the layout data.

This check process is performed by the bulk fix data generating section 52 in FIG. 5. In this check process, the bulk fix data generating section 52 (in FIG. 5) checks (determines) whether an originally prohibited process is performed on each of the logic cells to avoid manufacturing the bulk layer again after the bulk layer is manufactured once after the bulk fix is performed. To that end, this check process is to be performed before the tape out.

In this check process, first, in step S151 of FIG. 15, the logic cell is selected one by one so that the following steps S152 through 5154 are sequentially performed on each of the logic cells.

In step S152, the type of the logic cell selected in step S151 is determined. Namely, it is determined whether the selected logic cell corresponds to the design-change logic cell, the general logic cell other than the design-change logic cell, or the cell that is neither the design-change logic cell nor the general logic cell and that cannot be a target cell to be selected in the design change.

Next, in step S153, it is checked (determined) whether the selected cell is allowed to be arranged in its currently arranged position in the layout data. In other words, it is checked whether the relationship between the selected cell and its arranged position in the lay out data is allowed.

For example, as described above, normally, the design-change logic cell is arranged by arranging (forming) the EC cell in the EC site. However, if the design-change logic cell is arranged in the position (site) other than the EC site, it is determined that the relationship between the design-change logic cell and its arranged position of the selected cell is not allowed (NO in step S154).

In step S154, the next process to be performed is selected depending on the result of the determination in step S153.

In step S154, when determining that the result of the determination is not allowed (i.e., the relationship between the selected cell and the position of the selected cell is not allowed) (NO in step S154), the process goes to step S155.

In step S155, the bulk fix data generating section 52 (in FIG. 5) controls to display an information (error message) indicating that the cell is not allowed to be arranged in its position because the relationship between the selected cell and the position of the selected cell is not allowed, the information being displayed in the menu display of the computer 57 (in FIG. 5) via the menu display data generating section 53 (in FIG. 5) and the menu display section 54 (in FIG. 5).

By referring to such an error message in the menu on the display of the computer 57 (in FIG. 5), the operator may recognize that the operation (process) performed by the operator is originally prohibited after the bulk fix is performed. As a result, the design change process is performed to correct the error so that the all the logic cells can be arranged in their respective allowed positions (sites) where the relationships between the logic cells and the respective positions of the logic cells are allowed. Therefore, by assisting the operator to correct the process that is originally prohibited after the bulk fix is performed, it may become possible to effectively prevent the necessity for manufacturing the revised bulk layer after the manufacturing of the original bulk layer is started once due to the process that is originally prohibited after the bulk fix is performed.

Referring back to FIG. 15, when determining that the result of the determination is allowed (i.e., the relationship between the selected cell and the position of the selected cell is allowed) (YES is step S154), the process goes back to step S151 to select another logic cell when feasible.

FIG. 16 is a block diagram illustrating an exemplary configuration of a computer capable of realizing (performing) the packaging design supporting method for a semiconductor integrated circuit according to this embodiment of the present invention.

As illustrated in FIG. 16, the computer 1600 includes a CPU 1601, an operational section 1602, a display section 1603, a memory 1604, a hard disk drive 1605, a CD-ROM drive 1606, and a modem 1608. The CPU 1601 executes various operations by executing commands described in the given program. The operational section 1602 includes a keyboard, a mouse and the like through which the operator and designer inputs operations (instructions) and data. The display section 1603 may be a CRT, an LCD or the like on which a current status of the process being executed by the CPU 1601, a result of the process and the like are displayed. The memory 1604 stores and is used as a working area of a program executed and data used by the CPU 1601 and the like. The hard disk drive 1605 stores such a program and data. The CD-ROM drive 1606 is used to load a program and data from an external source using a CD-ROM 167. The modem 1608 is used to, for example, download a program from an external server via a communication network 1609 such as the Internet or a LAN.

The computer 1600 loads or downloads the packaging design supporting program for a semiconductor integrated circuit, the program including commands causing the CPU 1601 to execute the packaging design supporting method for the semiconductor integrated circuit. Then the program is installed in the hard disk drive 1605, and appropriately loaded to the memory 1604 so as to be executed by the CPU 1601. As a result, the packaging design supporting method for the semiconductor integrated circuit according to an embodiment of the present invention may be executed by the computer 1600.

According to an embodiment of the present invention, there is provided a packaging design supporting device for a semiconductor integrated circuit, the packaging design supporting device being capable of arranging logic cells constituting the semiconductor integrated circuit and designing wirings between the logic cells. The packaging design supporting device includes a selection data acquisition unit selecting a logic cell and inputting a change with respect to the selected logic cell; a bulk fix data generation unit generating bulk fix data in which, with respect to a semiconductor substrate of the semiconductor integrated circuit, a bulk layer of the semiconductor substrate of the semiconductor integrated circuit has been fixed, arranging, after the bulk fix data are generated, a design-change dummy logic cell in a region where no logic cell is arranged in the bulk layer, the design-change dummy logic cell having no wiring, and generating a design-change logic cell by wiring the design-change dummy logic cell in a region where the design-change dummy logic cell is arranged even after the bulk fix data are generated; and a selection cell move determination unit, when the bulk fix data generation unit generates the bulk fix data and the change with respect to the selected logic cell is input to the selection data acquisition unit, prohibiting the change with respect to the selected logic cell.

As described above, the selection cell move determination unit prohibits the change with respect to the selected cell when the bulk fix data generation unit generates the bulk fix data and the change with respect to the selected logic cell is input to the selection data acquisition unit. Due to this selection cell move determination unit, it may become possible to effectively prevent the logic cells from being changed after the bulk fix is performed. Therefore, it may become possible to effectively prevent the necessity for manufacturing the revised bulk layer after the manufacturing of the original bulk layer is started once due to the change of the logic cell after the bulk fix is performed.

Further, after the bulk data are generated, the design-change dummy logic cell having no wiring is arranged in the region where no logic cell is arranged in the bulk layer; and the design-change logic cell is generated by wiring the design-change dummy logic cell in region where the design-change dummy logic cell is arranged even after the bulk fix data are generated. Because of the feature, it may become possible to change a design by using the design-change logic cell by changing the design data of the wirings of the design-change dummy logic cell even after the bulk fix is performed, thereby enabling improving the operation timing of the logic circuit and the like.

According to an embodiment of the present invention, in the packaging design of the semiconductor integrated circuit, the change of the logic cells in the bulk layer after the bulk fix may be reliably prevented. Further, the operation timing and the like may be improved by performing the design change by using the design-change logic cell other than the logic cells that are fixed in their positions without performing the design change on the logic cells constituting the logic circuit after the bulk fix is performed. Because of these features, it may become possible to reduce the time period required to manufacture the semiconductor integrated circuit and, moreover, to provide a packaging design supporting program and a packaging design supporting method for a semiconductor integrated circuit capable of designing the configuration having maximally improved performance.

Further, in FIG. 5, the selection data acquiring section 55 corresponds to a selection data acquisition unit; the bulk fix data generating section 52 corresponds to a bulk fix data generation unit; the selection cell move determination section 56 corresponds to a selection cell move determination unit; the menu display section 54 corresponds to a menu display unit; and the menu display of the computer 57 corresponds to a display device connected to the packaging design supporting device for the semiconductor integrated circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the sprit and scope of the invention.

What is claimed is:

1. A packaging design supporting device for placing logic cells in a semiconductor integrated circuit and designing wirings between the logic cells, the packaging design supporting device comprising:
   a selection data acquisition unit that selects one of logic cells and inputs a change with respect to the selected logic cell;
   a bulk fix data generation unit that generates bulk fix data by which a bulk layer of the semiconductor substrate is fixed, and places a design-change dummy logic cell which is not wired in a region where no logic cell is placed in the bulk layer after the bulk fix data are generated, and generates a design-change logic cell by wiring the design-change dummy logic cell in the region where the design-change dummy logic cell is placed after the bulk fix data are generated; and
   a selection cell move determination unit that prohibits the change with respect to the selected logic cell when the bulk fix data generation unit generates the bulk fix data and the change with respect to the selected logic cell is input to the selection data acquisition unit.

2. The packaging design supporting device according to claim 1,
   wherein the selection cell move determination unit determines whether the bulk layer of the semiconductor substrate has been fixed with respect to the semiconductor substrate based on determining whether all the logic cells included in the semiconductor integrated circuit have been placed.

3. The packaging design supporting device according to claim 1,
   wherein the selection cell move determination unit allows an exchange between a first logic cell and a second logic cell provided so that a flip direction and a rotation direction of the first logic cell are the same as the flip direction and the rotation direction of the second logic cell, respectively.

4. The packaging design supporting device according to claim 1, further comprising:
   a menu display unit that displays a region where the design-change dummy logic cell is placed with higher brightness than a region other than the region where the design-change dummy logic cell is placed on a display device connected to the packaging design supporting device.

5. A packaging design supporting method for placing logic cells in a semiconductor integrated circuit and designing wirings between the logic cells, the packaging design supporting method comprising:
   inputting a change with respect to a selected one of the logic cells to a selection data acquiring section;
   generating bulk fix data by which a bulk layer of a semiconductor substrate is fixed;
   placing a design-change dummy logic cell which is not wired in a region where no logic cell is placed in the bulk layer after the bulk fix data are generated;

generating a design-change logic cell by wiring the design-change dummy logic cell in the region where the design-change dummy logic cell is placed after the bulk fix data are generated; and prohibiting, by a computer, the change with respect to the selected logic cell when the generating the bulk fix data with respect to the selected logic cell is inputted to the selection data acquisition section.

6. The packaging design supporting method according to claim 5, wherein a selection cell move determination section determines whether the bulk layer of the semiconductor substrate has been fixed with respect to the semiconductor substrate based on determining whether all the logic cells included in the semiconductor integrated circuit have been placed.

7. The packaging design supporting method according to claim 5, wherein a selection cell move determination section allows an exchange between a first logic cell and a second logic cell provided so that a flip direction and a rotation direction of the first logic cell are the same as the flip direction and the rotation direction of the second logic cell, respectively.

8. The packaging design supporting method according to claim 5, further comprising:

displaying, by a display of the computer, a region where the design-change dummy logic cell is placed is displayed with higher brightness than a region other than the region where the design-change dummy logic cell is placed on a display device connected to the packaging design supporting device.

9. A non transitory computer-readable recording medium storing a packaging design supporting program that causes a computer to execute:

inputting a change with respect to a selected one of logic cells to a selection data acquiring section;

generating bulk fix data by which a bulk layer of a semiconductor substrate is fixed, placing a design-change dummy logic cell which is not wired in a region where no logic cell is placed in the bulk layer after the bulk fix data are generated;

generating a design-change logic cell by wiring the design-change dummy logic cell in the region where the design-change dummy logic cell is placed after the bulk fix data are generated; and prohibiting the change with respect to the selected logic cell when the generating the bulk fix data with respect to the selected logic cell is inputted to the selection data acquisition section.

10. The non transitory computer-readable recording medium according to claim 9, wherein the selection cell move determination section determines whether the bulk layer of the semiconductor substrate has been fixed with respect to the semiconductor substrate based on determining whether all the logic cells included in the semiconductor integrated circuit have been placed.

11. The non transitory computer-readable recording medium according to claim 9, wherein the selection cell move determination section allows an exchange between a first logic cell and a second logic cell provided so that a flip direction and a rotation direction of the first logic cell are the same as the flip direction and the rotation direction of the second logic cell, respectively.

12. The non transitory computer-readable recording medium according to claim 9, further comprising:

displaying a region where the design-change dummy logic cell is placed is displayed with higher brightness than a region other than the region where the design-change dummy logic cell is placed on a display device connected to the packaging design supporting device.

* * * * *